US012761051B2

(12) United States Patent
Nakanishi et al.

(10) Patent No.: US 12,761,051 B2
(45) Date of Patent: Oct. 13, 2026

(54) ROTATION ANGLE SENSOR AND CALIBRATION METHOD OF ROTATION ANGLE SENSOR

(71) Applicant: Asahi Kasei Microdevices Corporation, Tokyo (JP)

(72) Inventors: Taiki Nakanishi, Tokyo (JP); Takato Katayama, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 282 days.

(21) Appl. No.: 18/503,185

(22) Filed: Nov. 7, 2023

(65) Prior Publication Data

US 2024/0159569 A1 May 16, 2024

(30) Foreign Application Priority Data

Nov. 16, 2022 (JP) ................................ 2022-183096
Aug. 4, 2023 (JP) ................................ 2023-127974

(51) Int. Cl.
*G01D 5/14* (2006.01)
*G01B 7/30* (2006.01)
*G01D 18/00* (2006.01)

(52) U.S. Cl.
CPC ............... *G01D 5/145* (2013.01); *G01B 7/30* (2013.01); *G01D 18/004* (2013.01)

(58) Field of Classification Search
None
See application file for complete search history.

(56) References Cited

U.S. PATENT DOCUMENTS

2008/0228423 A1 9/2008 Hayashi
2011/0134984 A1 6/2011 Seo
2017/0146370 A1 5/2017 Gleissberg
2017/0356986 A1 12/2017 Iwazawa
2021/0148734 A1* 5/2021 Foletto ............... G01D 5/24485

FOREIGN PATENT DOCUMENTS

DE 102019114172 A * 12/2020 ............. G01D 18/00
EP 3427011 B1 * 12/2020 ......... G01D 5/24485
JP S61149822 A 7/1986
JP 2014025871 A 2/2014
JP 2016061708 A * 4/2016
JP 2016080408 A * 5/2016
JP 2019028037 A * 2/2019
JP 2021119135 A * 8/2021 ............. C09K 11/06

* cited by examiner

*Primary Examiner* — Daniel S Larkin

(57) ABSTRACT

To provide a rotation angle sensor which outputs N periods (N>1) of a first signal of a first phase and a second signal of a second phase forming a predetermined phase angle with the first phase per single rotation of a rotating body. The rotation angle sensor includes a calibration parameter calculating part which calculates, in a mechanical angle of one angular range having a first mechanical angle different from a reference mechanical angle as its starting point, based on the first signal and the second signal, a calibration parameter which calibrates an error in a moving radius of the rotating body in the reference mechanical angle of the rotating body. The one angular range may have the first mechanical angle as its starting point and a second mechanical angle as its ending point.

18 Claims, 29 Drawing Sheets

ROTATION ANGLE SENSOR AND CALIBRATION METHOD OF ROTATION ANGLE SENSOR

The contents of the following patent application(s) are incorporated herein by reference:

NO. 2022-183096 filed in JP on Nov. 16, 2022

NO. 2023-127974 filed in JP on Aug. 4, 2023

BACKGROUND

1. Technical Field

The present invention relates to a rotation angle sensor and a calibration method of the rotation angle sensor.

2. Related Art

Patent document 1 describes, "by removing a component deteriorating interpolation accuracy per rotational position, the interpolation accuracy is improved" (ABSTRACT).

PRIOR ART DOCUMENT

Patent Document

Patent Document 1: Japanese Patent Application Publication No. 2008-232649

DESCRIPTION OF EXEMPLARY EMBODIMENTS

Hereinafter, the present invention will be described through embodiments of the invention, but the following embodiments do not limit the invention according to claims. In addition, not all combinations of features described in the embodiment are essential to the solution of the invention.

Figure 1:
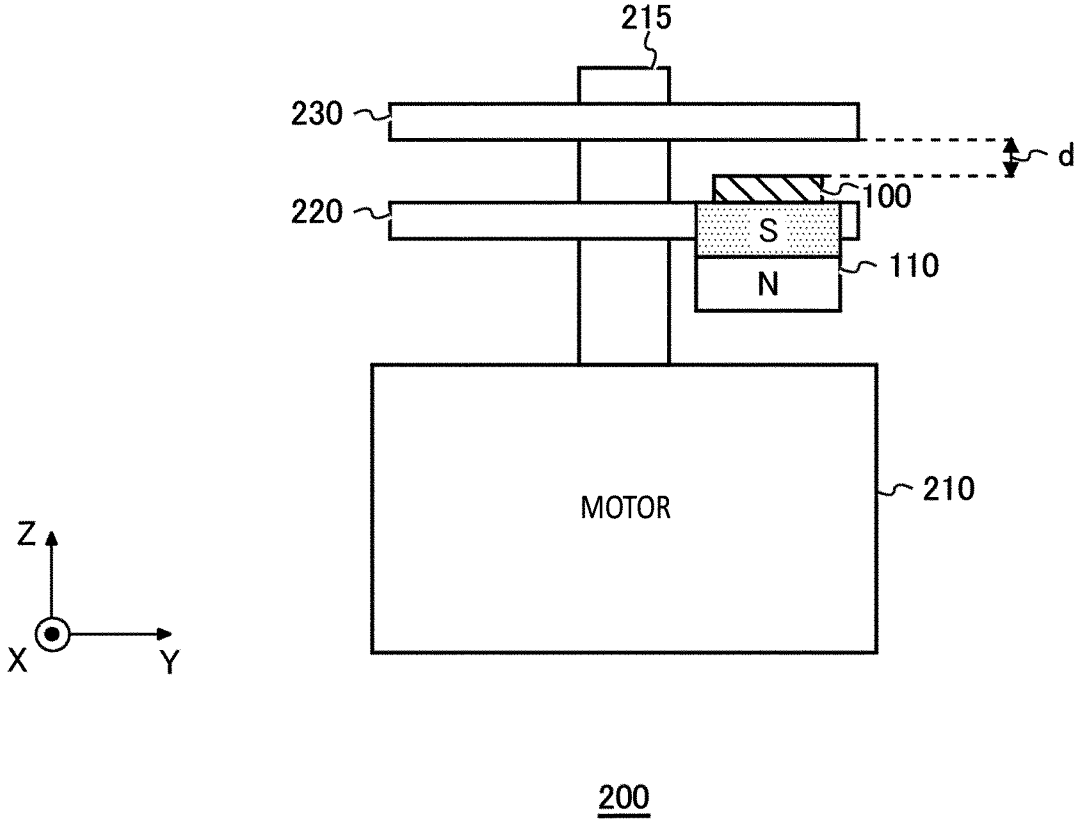
FIG. 1 shows an example of a sensor apparatus 200 according to one embodiment of the present invention.

FIG. 1 shows an example of a sensor apparatus 200 according to one embodiment of the present invention. The sensor apparatus 200 of the present example includes a rotation angle sensor 100, a signal generating part 110, a motor 210, a fixing member 220, and a rotating body 230. In the present example, the rotation angle sensor 100 and the signal generating part 110 are fixed to the fixing member 220.

The rotation angle sensor 100 of the present example is a magnetic sensor. The rotation angle sensor 100 may be an optical sensor. The signal generating part 110 of the present example is a magnetic field generating part which generates a magnetic field. The magnetic field generating part may be a magnet. The rotating body 230 of the present example is a magnetic disk. The rotating body 230 is fixed to an axis of rotation 215 of the motor 210.

In the present specification, technical matters may be described by using orthogonal coordinate axes of an X axis, a Y axis, and a Z axis. In the present specification, a surface parallel to a plate surface of the rotating body 230 is regarded as an XY plane, and a direction from the motor 210 to the rotating body 230 which is along the axis of rotation 215 is regarded as a Z-axis direction. In the present specification, a direction passing through a center of the axis of rotation 215 and the rotation angle sensor 100 in the XY plane is regarded as a Y-axis direction, and a direction orthogonal to the Y axis in the XY plane is regarded as an X-axis direction. The Z-axis direction may be a direction parallel to the vertical direction, and the XY plane may be the horizontal surface.

In the present specification, the rotating body 230 side in the sensor apparatus 200 is referred to as "upper", and the motor 210 side in the sensor apparatus 200 is referred to as "lower". In the present specification, a view seen in a direction from the rotating body 230 to the motor 210 is referred to as the top view.

Figure 2:
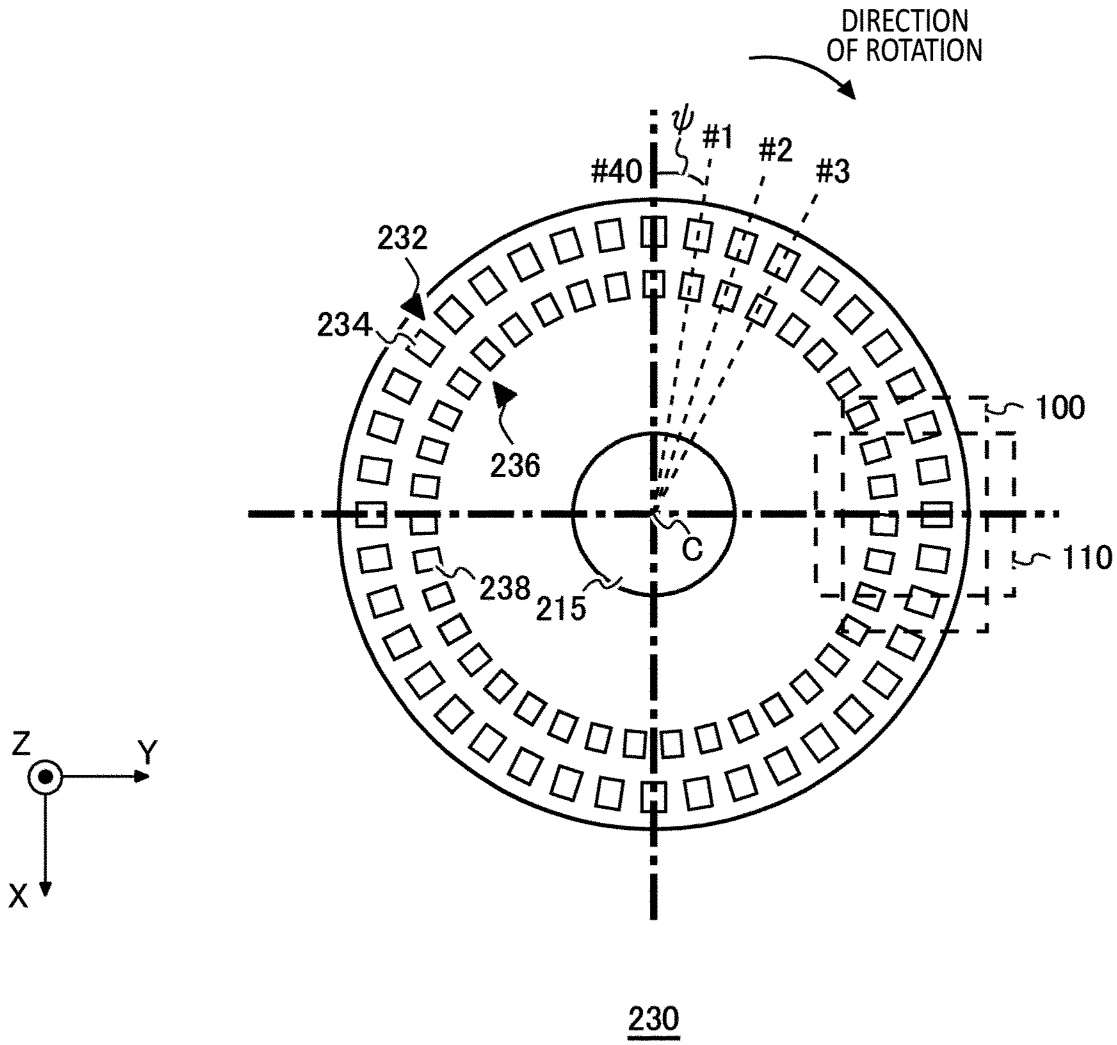
FIG. 2 is a drawing of a rotating body 230 illustrated in FIG. 1, in a top view.

FIG. 2 is a drawing of the rotating body 230 illustrated in FIG. 1, in the top view. In FIG. 2, a position of the rotation angle sensor 100 and a position of the signal generating part 110 in the top view are illustrated with coarse broken lines. In FIG. 2, a direction passing through a center C of the axis of rotation 215 and being parallel to the X-axis direction, and a direction passing through the center C of the axis of rotation 215 and being parallel to the Y-axis direction, are illustrated with thick dashed lines.

The rotating body 230 of the present example is provided with a main scale (Master) 232 and a vernier scale (Nonius) 236. The main scale 232 and the vernier scale 236 are circular regions centered at the center C of the axis of rotation. In the present example, the main scale 232 and the vernier scale 236 are concentrically provided, and the vernier scale 236 is provided on the inner side of the main scale 232.

The main scale 232 is provided with a plurality of slits 234. The vernier scale 236 is provided with a plurality of slits 238. The plurality of slits 234 are radially formed such that all central angles formed with two adjacent slits 234 and the center C become equal. The plurality of slits 238 are radially formed such that all central angles formed with two adjacent slits 238 and the center C become equal. In the present specification, this central angle is regarded as a mechanical angle ψ.

The slits 234 and the slits 238 may be given slit numbers along a direction of rotation of the rotating body 230. In FIG. 2, the slit numbers of the slits 234 are illustrated from #1 to #3. In the present example, forty slits 234 are provided for the main scale 232, and thirty-nine slits 238 are provided for the vernier scale 236.

Figure 3:
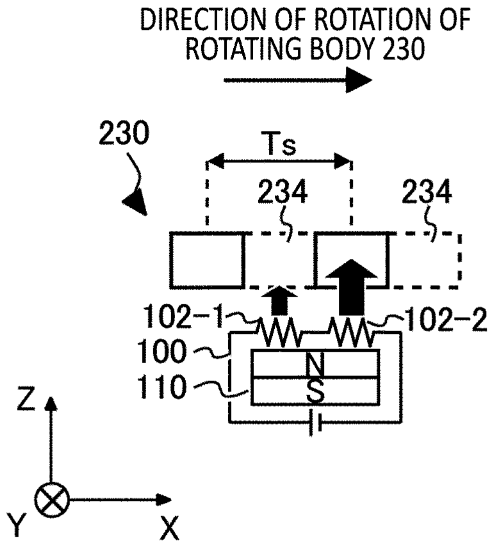
FIG. 3 is a drawing of neighborhood of the rotating body 230, a rotation angle sensor 100, and a signal generating part 110 illustrated in FIG. 1 and FIG. 2 seen in a Y-axis direction.
Figure 4:
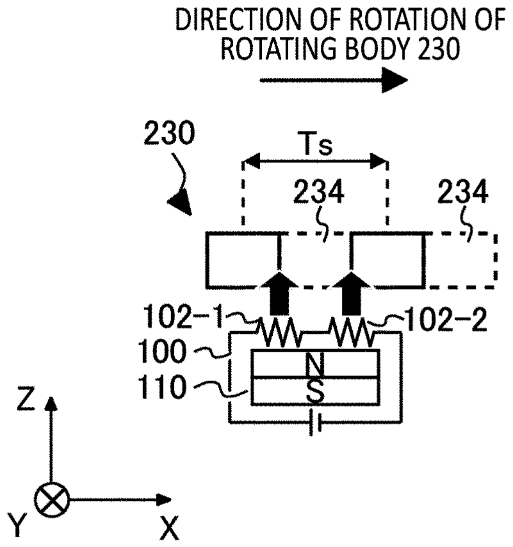
FIG. 4 is a drawing of neighborhood of the rotating body 230, the rotation angle sensor 100, and the signal generating part 110 illustrated in FIG. 1 and FIG. 2 seen in the Y-axis direction.
Figure 5:
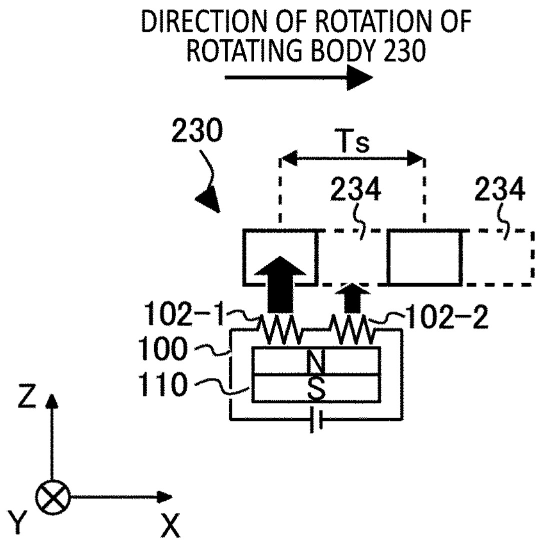
FIG. 5 is a drawing of neighborhood of the rotating body 230, the rotation angle sensor 100, and the signal generating part 110 illustrated in FIG. 1 and FIG. 2 seen in the Y-axis direction.

FIG. 3 to FIG. 5 are drawings of neighborhood of the rotating body 230, the rotation angle sensor 100, and the signal generating part 110 illustrated in FIG. 1 and FIG. 2 seen in the Y-axis direction. FIG. 3 to FIG. 5 illustrate a positional relationship between the rotating body 230 and the rotation angle sensor 100. The rotation angle sensor 100 of the present example has two detection parts 102 (a detection part 102-1 and a detection part 102-2). A period of the slits 234 is regarded as a period Ts. In the present example, the two detection parts 102 are arranged separate from each other by the same distance as the period Ts, along the direction of rotation of the rotating body 230.

FIG. 3 is the positional relationship between the rotating body 230 and the rotation angle sensor 100 when a signal detected with the detection part 102-2 becomes the largest, and a signal detected with the detection part 102-1 becomes the smallest. FIG. 4 is the positional relationship between the rotating body 230 and the rotation angle sensor 100 when the signal detected with the detection part 102-2 and the signal detected with the detection part 102-1 become equal. FIG. 5 is the positional relationship between the rotating body 230 and the rotation angle sensor 100 when the signal detected with the detection part 102-2 becomes the smallest, and the signal detected with the detection part 102-1 becomes the largest.

Figure 6:
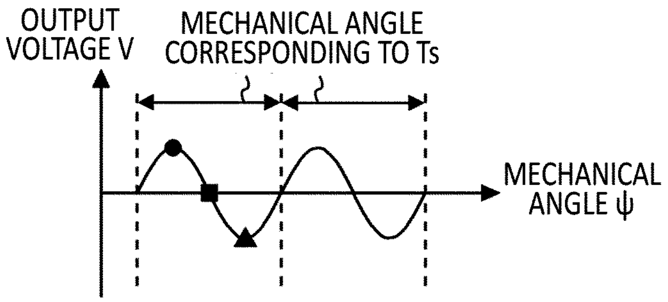
FIG. 6 shows an example of a relationship between an output V of the rotation angle sensor 100 and a mechanical angle ψ of the rotating body 230.

FIG. 6 shows an example of a relationship between an output V of the rotation angle sensor 100 and the mechanical angle ψ of the rotating body 230. As described above, the positional relationship between the rotating body 230 and the rotation angle sensor 100 changes in accordance with a rotation of the rotating body 230. Thus, the output V of the rotation angle sensor 100 changes in a sine wave shape with respect to a change of the mechanical angle ψ. In FIG. 6, the mechanical angles ψ when the positional relationships between the rotating body 230 and the rotation angle sensor 100 are those in FIG. 3, FIG. 4, and FIG. 5 are illustrated with a circle, a quadrangle, and a triangle, respectively. FIG. 3 is a case when the positive output voltage V becomes the largest. FIG. 4 is a case when the output voltage V is zero. FIG. 5 is a case when the negative output voltage V becomes the largest.

Figure 7:
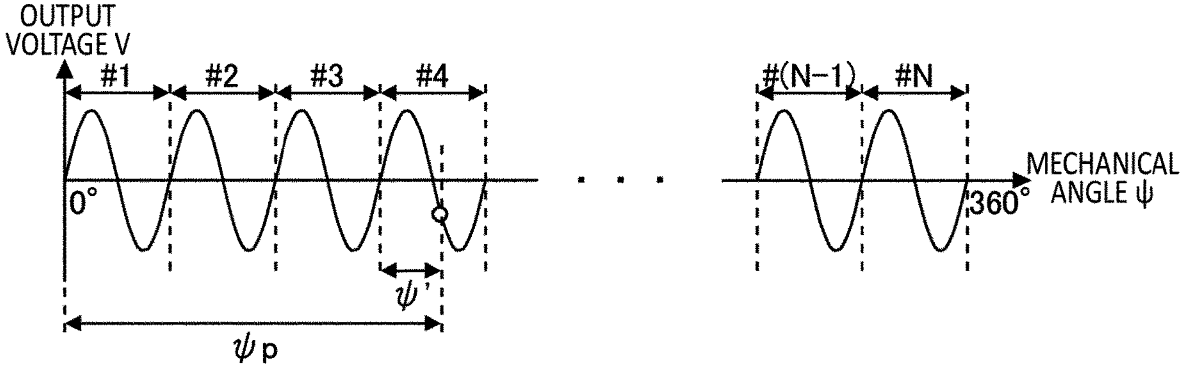
FIG. 7 shows the relationship between the output V of the rotation angle sensor 100 and the mechanical angle ψ of the rotating body 230 per single rotation of the rotating body 230.

FIG. 7 shows the relationship between the output V of the rotation angle sensor 100 and the mechanical angle ψ of the rotating body 230 per single rotation of the rotating body 230. FIG. 7 also illustrates the slit numbers of the slits 234 (see FIG. 2). In the present example, a slit number N is 40. It is assumed that the mechanical angle ψ of the rotating body 230 is currently at a position illustrated with a white circle. A rotation angle from a start point of the mechanical angle ψ in slit number 4 to the white circle is regarded as a mechanical angle ψ'. A rotation angle from the mechanical angle ψ that is 0° to the white circle is regarded as a mechanical angle ψp. The rotation angle sensor 100 calculates the mechanical angle ψp based on the slit number and the mechanical angle ψ'.

Figure 8:
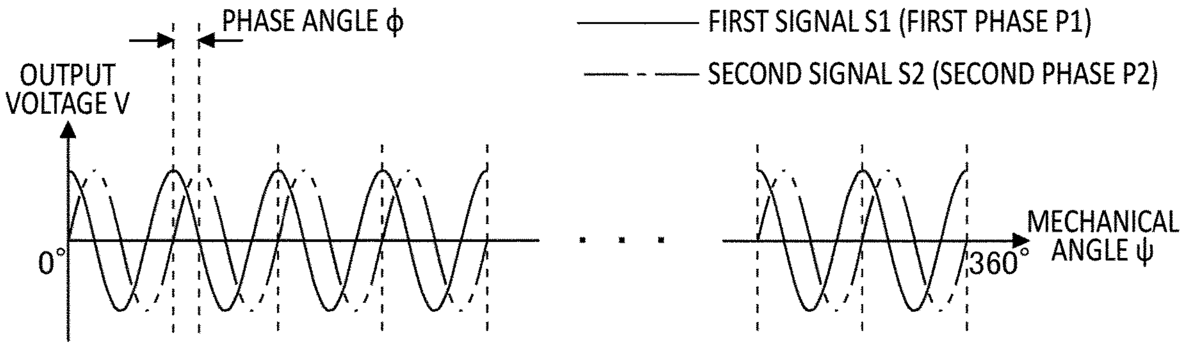
FIG. 8 shows an example of the relationship between the output V of the rotation angle sensor 100 and the mechanical angle ψ of the rotating body 230.

FIG. 8 shows an example of the relationship between the output V of the rotation angle sensor 100 and the mechanical angle ψ of the rotating body 230. In FIG. 8, the relationship between the output V of the rotation angle sensor 100 and the mechanical angle ψ of the rotating body 230 illustrated in FIG. 7 is illustrated with a solid line. A signal illustrated with the solid line is regarded as a first signal S1, and a phase of the first signal S1 is regarded as a first phase P1. A signal having a phase different from the first phase is regarded as a second signal S2. The phase of the second signal S2 is regarded as a second phase P2. The second phase P2 forms a predetermined phase angle ϕ with the first phase P1. In FIG. 8, the second signal S2 is illustrated with a dashed line.

The rotation angle sensor 100 outputs N periods of the first signal S1 and the second signal S2 per single rotation of the rotating body 230. N is larger than 1. In the present example, N is 40. N may not be an integer.

The phase angle ϕ may be 90°, may be an acute angle, or may be an obtuse angle. The phase angle ϕ may be 85° or greater and 95° or smaller, may be 80° or greater and 100° or smaller, or may be 70° or greater and 110° or smaller. In the present example, the phase angle ϕ is 90°. In the present example, the first signal S1 is a cosine wave (cos wave), and the second signal S2 is a sine wave (sin wave).

Figure 9:
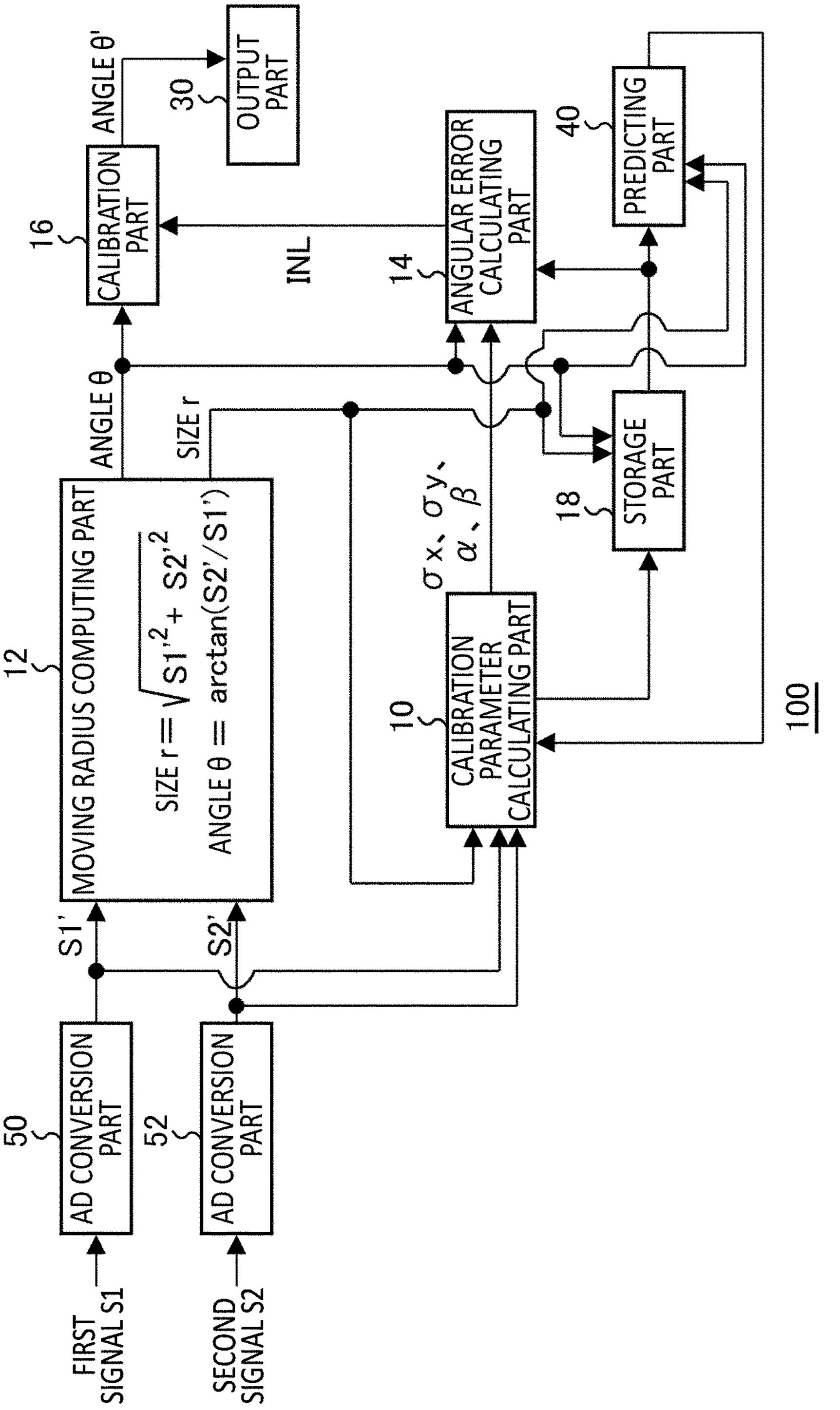
FIG. 9 is a block diagram illustrating an example of the rotation angle sensor 100 according to one embodiment of the present invention.

FIG. 9 is a block diagram illustrating an example of the rotation angle sensor 100 according to one embodiment of the present invention. The rotation angle sensor 100 includes a calibration parameter calculating part 10. The rotation angle sensor 100 may include a moving radius computing part 12, an angular error calculating part 14, a calibration part 16, an AD conversion part 50, and an AD conversion part 52. The rotation angle sensor 100 may further include a storage part 18, a predicting part 40, and an output part 30.

The rotation angle sensor 100 may be achieved by a computer. The calibration parameter calculating part 10 may be a Central Processing Unit (CPU) of the computer. The moving radius computing part 12, the angular error calculating part 14, and the calibration part 16 may be further included in the CPU. A program for causing the computer to function as the rotation angle sensor 100 may be installed in the computer.

In the present example, the first signal S1 is an analog signal. The AD conversion part 50 converts the first signal S1 into a digital signal. The first signal S1 converted into the digital signal is regarded as a signal S1'. In the present example, the second signal S2 is an analog signal. The AD conversion part 52 converts the second signal S2 into a digital signal. The second signal S2 converted into the digital signal is regarded as a signal S2'.

Figure 10:
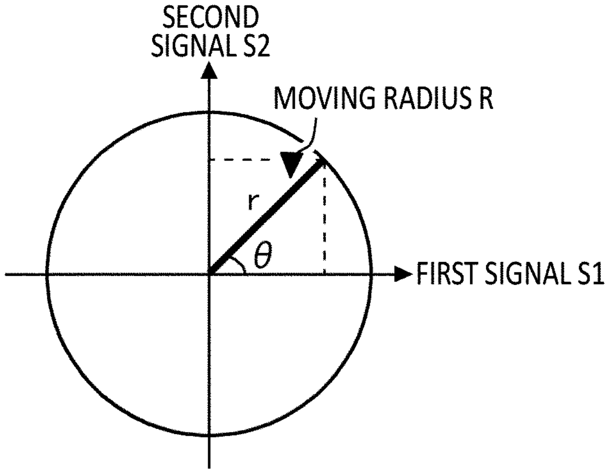
FIG. 10 shows an example of a relationship between a first signal S1 and a second signal S2.

FIG. 10 shows an example of a relationship between the first signal S1 and the second signal S2. The moving radius computing part 12 (see FIG. 9) calculates an angle θ and a size r of the moving radius R of the rotating body 230 based on the first signal S1 and the second signal S2. In the present example, the moving radius computing part 12 (see FIG. 9) calculates the size r and the angle θ of the moving radius R of the rotating body 230 based on following Expression 1 and Expression 2, respectively.

Expression 1

$$r = \sqrt{S1'^2 + S2'^2} \quad (1)$$

Expression 2

$$\theta = \arctan(S2'/S1') \quad (2)$$

FIG. 10 is a so-called Lissajous figure. FIG. 10 expresses a locus of the moving radius R. When the first signal S1 is a cosine wave and the second signal is a sine wave, the Lissajous figure is ideally a circular shape centered at the origin. In the present example, the size r of the moving radius R is a radius of the Lissajous figure having the circular shape.

The calibration parameter calculating part 10 (see FIG. 9) calculates, based on the first signal S1 and the second signal S2, a calibration parameter which calculates an error in the moving radius R of the rotating body 230. The error in the moving radius R refers to at least one of an error in the angle θ and an error in the size r of the moving radius R. In the present example, the calibration parameter calculating part 10 calculates the calibration parameter based on the signal S1' and the signal S2'.

Figure 11:
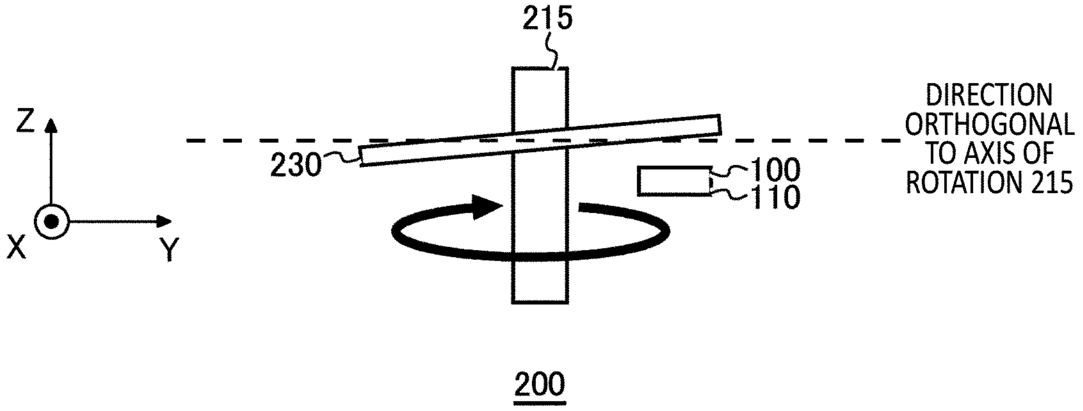
FIG. 11 shows an example of a positional relationship between the rotating body 230 and an axis of rotation 215 in the sensor apparatus 200.

FIG. 11 shows an example of a positional relationship between the rotating body 230 and the axis of rotation 215 in the sensor apparatus 200. In FIG. 11, the fixing member 220 and the motor 210 illustrated in FIG. 1 are omitted. In the present example, the rotating body 230 is inclined from a direction (the coarse broken line portion in FIG. 11) orthogonal to the axis of rotation 215. The rotating body 230 to be mounted on the axis of rotation 215 may be inclined from the direction orthogonal to the axis of rotation 215 as illustrated in FIG. 11.

Figure 12:
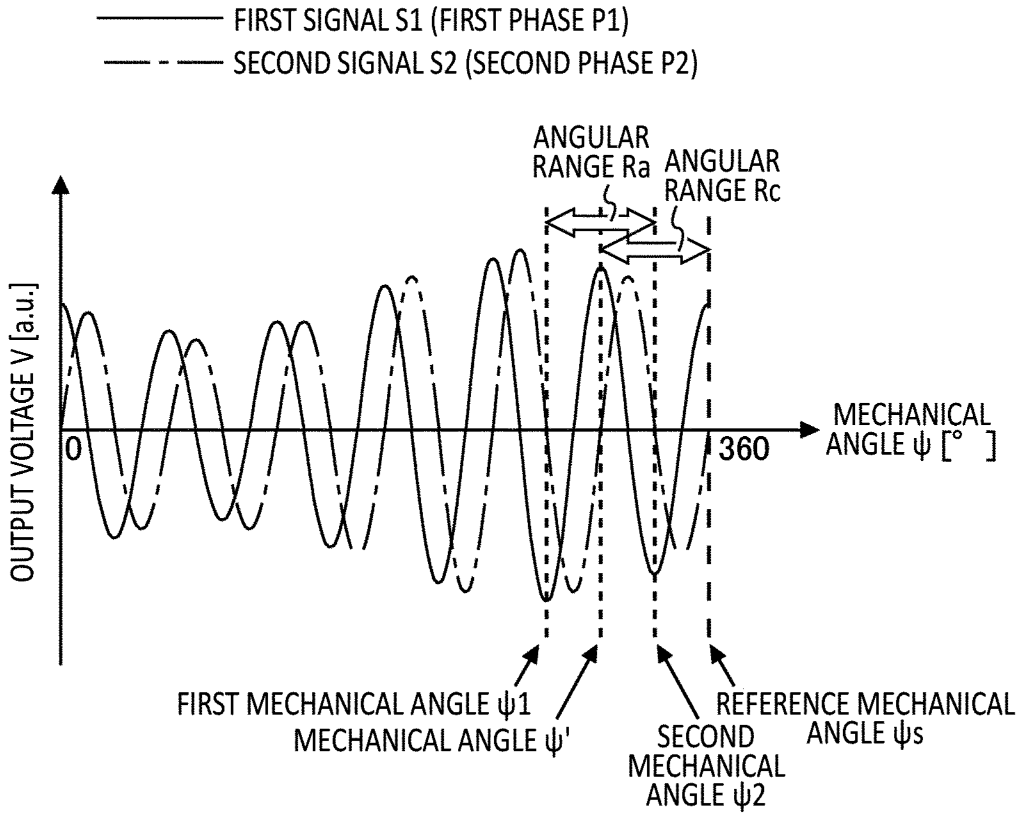
FIG. 12 shows an example of a relationship between the output V of the rotation angle sensor 100 and a rotation angle θ of the rotating body 230 in the sensor apparatus 200 of FIG. 11.

FIG. 12 shows an example of a relationship between the output V of the rotation angle sensor 100 and a rotation angle θ of the rotating body 230 in the sensor apparatus 200 of FIG. 11. In the case of the example in FIG. 11, a distance d (see FIG. 1) between the rotating body 230 and the rotation angle sensor 100 changes in accordance with a rotation of the rotating body 230. Thus, the output V changes in accordance with a change in the mechanical angle ψ.

One mechanical angle in the mechanical angle ψ is regarded as a reference mechanical angle ψs. The reference mechanical angle ψs may be a current position of the mechanical angle ψ of the moving radius R (see FIG. 10). The reference mechanical angle ψs may be a point of measurement of the mechanical angle ψ which has been currently measured by the rotation angle sensor 100. In the present example, the reference mechanical angle ψs is 360°.

A rotation angle which forms an angle of a predetermined angular range Rc with the reference mechanical angle ψs is regarded as the mechanical angle ψ'. In the example of FIG. 12, the angular range Rc corresponds to one period of the first signal S1 and the second signal S2. A mechanical angle which forms an angle of one angular range Ra with a first mechanical angle ψ1 is regarded as a second mechanical angle ψ2. In the example of FIG. 12, the angular range Ra corresponds to one period of the first signal S1 and the second signal S2. The angular range Ra may be predetermined, or it may be determined based on the angle θ of the moving radius R.

The first mechanical angle ψ1 and the second mechanical angle ψ2 are different from the reference mechanical angle ψs. The reference mechanical angle ψs, the first mechanical angle ψ1, and the second mechanical angle ψ2 may be predetermined, or these may be determined based on the angle θ of the moving radius R. In the present example, the first mechanical angle ψ1 and the second mechanical angle ψ2 are smaller than the reference mechanical angle ψs. In the present example, the reference mechanical angle ψs and the second mechanical angle ψ2 form an angle corresponding to a half period of the first signal S1 and the second signal S2. In the present example, the first mechanical angle ψ1 is smaller than the second mechanical angle ψ2.

Figure 13:
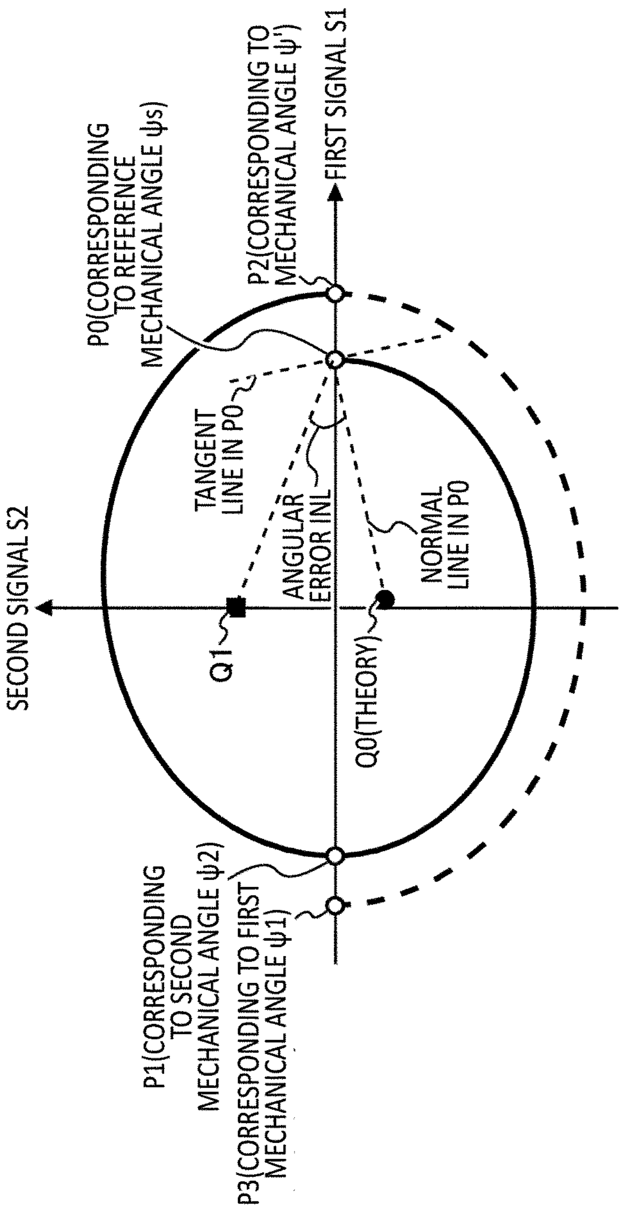
FIG. 13 shows an example of the relationship between the first signal S1 and the second signal S2 from a first mechanical angle ψ1 to a reference mechanical angle ψs in FIG. 12.

FIG. 13 shows an example of the relationship between the first signal S1 and the second signal S2 from the first mechanical angle ψ1 to the reference mechanical angle ψs in FIG. 12. In the present example, the output V changes in accordance with a change in the mechanical angle ψ. Thus, the moving radius R may become different depending on the mechanical angle ψ. In the present example, the locus of the moving radius R is a helical shape.

In the relationship between the first signal S1 and the second signal S2 illustrated in FIG. 13, a position corresponding to the reference mechanical angle ψs is regarded as a position P0, a position corresponding to the second mechanical angle ψ2 is regarded as a position P1, a position corresponding to the mechanical angle ψ' is regarded as a position P2, and a position corresponding to the first mechanical angle ψ1 is regarded as a position P3. In FIG. 13, the locus of the moving radius R from the position P3 to the position P2 is illustrated with a thick coarse broken line, and the locus of the moving radius R from the position P2 to the position P0 is illustrated with a solid line. The locus of the moving radius R from the position P2 to the position P0 corresponds to the angular range Rc in FIG. 12.

In FIG. 13, a center of the locus of the moving radius R from the position P1 to the position P0 is regarded as a position Q0. In FIG. 13, the position Q0 is illustrated with a black circle. When the axis of the first signal S1 is regarded as an x axis, the axis of the second signal S2 is regarded as a y axis, and the size r of the moving radius R is regarded as following Expression (3-1), coordinates (Cx, Cy) of the position Q0 is expressed by following Expression (3-2).

Expression 3

$$r = a\theta + b \tag{3-1}$$

$$\begin{pmatrix} Cx \\ Cy \end{pmatrix} = \begin{pmatrix} x \\ y \end{pmatrix} + \frac{\left\{\left(\frac{dx}{d\theta}\right)^2 + \left(\frac{dy}{d\theta}\right)^2\right\}^{\frac{1}{2}}}{\frac{dx}{d\theta}\frac{d^2y}{d^2\theta} - \frac{dy}{d\theta}\frac{d^2x}{d^2\theta}} * \begin{pmatrix} -\frac{dy}{d\theta} \\ \frac{dx}{d\theta} \end{pmatrix} \fallingdotseq \begin{pmatrix} -a\sin\theta \\ a\cos\theta \end{pmatrix}\Big|_{\varphi_s} \tag{3-2}$$

From Expression 3, the position Q0 is arranged on a normal line in the position P0. The position Q0 is a theoretical center position in the position P0 on the moving radius R. In FIG. 13, the normal line in the position P0 is illustrated with a fine broken line.

In FIG. 13, a center of the moving radius R (that is, the solid line in FIG. 13) of the angular range Rc (that is, from the position P2 to the position P0) in FIG. 12 is regarded as a position Q1. In FIG. 13, the position Q1 is illustrated with a black quadrangle. In the present example, since the locus of the moving radius R is a helical shape, the position Q1 may be different from the position Q0. Thus, an angular error INL illustrated in FIG. 13 may be caused in the angle θ of the moving radius R. In the present example, the size r of the moving radius R from the position P2 to the position P1 is larger than the size r of the moving radius R from the position P1 to the position P0. Thus, the position Q1 is arranged on the opposite side of the position Q0 with reference to the x axis (the axis of the first signal S1).

Figure 14:
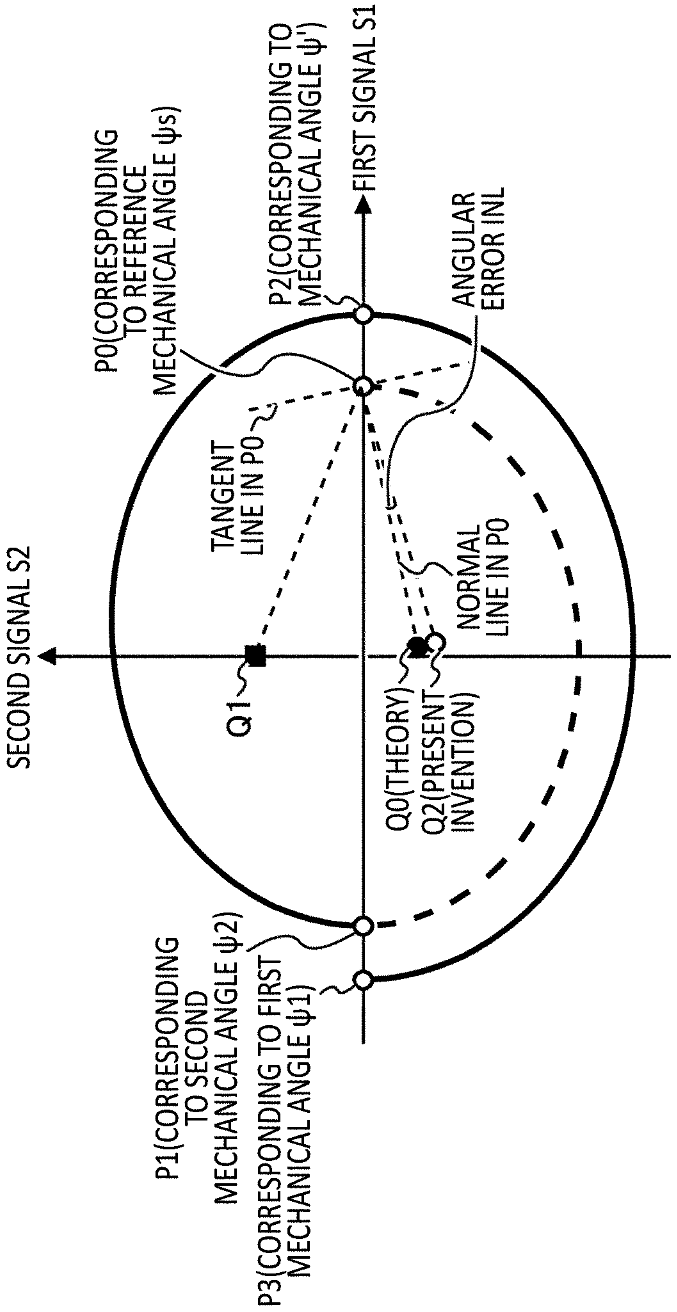
FIG. 14 shows an example of the relationship between the first signal S1 and the second signal S2 from the first mechanical angle ψ1 to the reference mechanical angle ψs in FIG. 12.

FIG. 14 shows an example of the relationship between the first signal S1 and the second signal S2 from the first mechanical angle ψ1 to the reference mechanical angle ψs in FIG. 12. In FIG. 14, the locus of the moving radius R from the position P3 to the position P2 illustrated with the thick broken line in FIG. 13 is illustrated with a thick solid line, and the locus of the moving radius R from the position P1 to the position P0 illustrated with the thick solid line in FIG. 13 is illustrated with a thick coarse broken line. In FIG. 14, a center of the moving radius R (that is, the solid line in FIG. 14) of the angular range Ra (that is, from the position P3 to the position P1) in FIG. 12 is regarded as a position Q2.

The error in the moving radius R may include an error due to positional displacement (offset) of the center of the moving radius R, an amplitude error in the moving radius R, and a phase error in the moving radius R. The positional displacement of the center of the moving radius R in the x-axis direction (the axial direction of the first signal S1) is denoted by σx, and the positional displacement of the center of the moving radius R in the y-axis direction (the axial direction of the second signal S2) is denoted by σy. The amplitude error in the moving radius R is denoted by α. The phase error in the moving radius R is denoted by β. The signal S1' (see FIG. 9) is denoted by Vx(θ), and the signal S2' (see FIG. 9) is denoted by Vy(θ). An ideal size of the moving radius R is denoted by $r_{ideal}$. The ideal moving radius R is the moving radius R when the Lissajous figure is a circular shape centered at the origin (see FIG. 10). Vx(θ) and Vy(θ) are expressed by following Expression 4.

Expression 4

$$V_x(\theta) = r_{ideal}\cos\theta + \sigma_x + \alpha\cdot\cos\theta + \beta\cdot\sin\theta \tag{4-1}$$

$$V_y(\theta) = r_{ideal}\sin\theta + \sigma_y - \alpha\cdot\sin\theta + \beta\cdot\cos\theta \tag{4-2}$$

When Expression 4 is expressed on the complex plane by following Expression (5-1), Expression (5-2) can be obtained.

Expression 5

$$Vout(\theta) = Vx(\theta) + i\cdot Vy(\theta) \tag{5-1}$$

$$Vout(\theta) = r_{ideal}e^{i\theta} + (\sigma_x + i\cdot\sigma_y)e^0 + (\alpha + i\cdot\beta)e^{-i\theta} \tag{5-2}$$

From Expression (5-2), the size r of the moving radius R, an error Δr in the size r of the moving radius R, and the angular error INL in the moving radius R are expressed by following Expression (6-1), Expression (6-2), and Expression (6-3), respectively.

Expression 6

$$r = \mathrm{Re}(Vout)(\theta)\cdot e^{-i\theta}) = 1 + \sigma_x\cos\theta + \sigma_y\sin\theta + a\cos 2\theta + \beta\sin 2\theta \tag{6-1}$$

$$\Delta r = \sigma_x\cos\theta + \sigma_y\sin\theta + \alpha\cos 2\theta + \beta\sin 2\theta \tag{6-2}$$

$$INL = \frac{\mathrm{Im}\left(Vout(\theta)\cdot e^{-i\theta}\right)}{r - \Delta r} = \frac{1}{r_{ideal}}(-\sigma_x\sin\theta \div \sigma_y\cos\theta - a\sin 2\theta + \beta\cos 2\theta) \tag{6-3}$$

As shown in Expression 6, r and INL are expressed by the angle θ of the moving radius R, the positional displacement σx, σy of the center of the moving radius R, the amplitude error α in the moving radius R, and the phase error β in the moving radius R. The angle θ of the moving radius R may be the angle θ before calibration of the moving radius R. An average value of the size r of the moving radius R from the position P1 to the position P3 is denoted by $r_{ave}$. In Expression (6-3), $r_{ideal}$ may be calculated by using $r_{ave}$, or may be calculated by using the size r of the moving radius R after calibration −Δr.

The calibration parameter calculating part 10 (see FIG. 9) calculates, in the mechanical angle ψ of the angular range Ra (that is, from the position P3 to the position P1) having the first mechanical angle ψ1 as its starting point, based on the first signal S1 and the second signal S2, a calibration parameter Pr which calibrates an error in the moving radius R in the reference mechanical angle ψs (that is, the position P0). The calculation of the calibration parameter Pr in the mechanical angle ϕ of the angular range Ra based on the first signal S1 and the second signal S2 refers to calculating the calibration parameter Pr in a plurality of the mechanical angles ϕ from the first mechanical angle ϕ1 to the second mechanical angle ϕ2 based on the first signal S1 and the second signal S2 in each mechanical angle ϕ. The angular range Ra may be one period of the first signal S1 and the second signal S2.

The calibration parameter calculating part 10 may calculate the calibration parameter Pr based on the angle θ (see FIG. 10) and the size r of the moving radius R of the rotating body 230 computed by the moving radius computing part 12. In the present example, the calibration parameter Pr is σx, σy, α, β and $r_{ave}$.

When the predetermined mechanical angle ψ is one period of the first signal S1 and the second signal S2, σx, σy, α, β and $r_{ave}$ may be calculated by following Expression 7.

Expression 7

$$\sigma_x = \frac{\sum_{i=0}^{m} R_i \cos((2\pi/(m+1)) * i)}{((m+1)/2)} \quad (7\text{-}1)$$

$$\sigma_y = \frac{\sum_{i=0}^{m} R_i \sin((2\pi/(m+1)) * i)}{((m+1)/2)} \quad (7\text{-}2)$$

$$\alpha = \frac{\sum_{i=0}^{m} R_i \cos((4\pi/(m+1)) * i)}{((m+1)/2)} \quad (7\text{-}3)$$

$$\beta = \frac{\sum_{i=0}^{m} R_i \sin((4\pi/(m+1)) * i)}{((m+1)/2)} \quad (7\text{-}4)$$

$$r_{ave} = \frac{\sum_{i=0}^{m} R_i}{m+1} \quad (7\text{-}5)$$

The angular error calculating part 14 (see FIG. 9) calculates the angular error INL in the moving radius R based on the calibration parameter Pr. The angular error calculating part 14 may calculate the angular error INL by Expression (6-3). In Expression (6-3), $r_{ideal}$ may be calculated by using $r_{ave}$. In the present example, the locus of the moving radius R is a helical shape. When the locus of the moving radius R is a helical shape, $r_{ave}$ may include an error with respect to $r_{ideal}$. Thus, $r_{ideal}$ may also be calculated by using the size r of the moving radius R after calibration −Δr. The calibration part 16 (see FIG. 9) calibrates the angle θ of the moving radius R based on the angular error INL. The calibration part 16 (see FIG. 9) may calibrate the angle θ per the predetermined mechanical angle ψ in the angular range Ra based on the angular error INL. The angle θ calibrated by the calibration part 16 is regarded as an angle θ'. The output part 30 (see FIG. 9) outputs the angle θ'.

In the present example, the calibration parameter calculating part 10 (see FIG. 9) calculates the calibration parameter Pr in a mechanical angle of the angular range Ra having the first mechanical angle ψ1 different from the reference mechanical angle ψs as its starting point. In the present example, the calibration part 16 (see FIG. 9) calibrates the angle θ of the moving radius R based on the calculated calibration parameter Pr. Thus, the angular error INL in the angle θ is likely to become smaller as compared to when the calibration part 16 calibrates the angle θ of the moving radius R based on the calibration parameter Pr calculated in a mechanical angle of the angular range Rc (see FIG. 12) having the reference mechanical angle ψs as its starting point.

The angle θ (see FIG. 10) and the size r of the moving radius R of the rotating body 230 computed by the moving radius computing part 12 may be stored on the storage part 18 (FIG. 9). The angular error calculating part 14 (see FIG. 9) may calculate the angular error INL in the moving radius R based on the calibration parameter Pr calculated by the calibration parameter calculating part 10 and the calibration parameter Pr stored on the storage part 18.

In the example of FIG. 14, the angular range Ra (see FIG. 12) has the first mechanical angle ψ1 as its starting point and the second mechanical angle ψ2 as its ending point. The first mechanical angle ψ1 and the second mechanical angle ψ2 are smaller than the reference mechanical angle ψs. A difference between the angle θ (see FIG. 10) of the moving radius in the reference mechanical angle ψs and the angle θ (see FIG. 10) of the moving radius in the second mechanical angle ψ2 may be greater than 0°+(n×360°) and smaller than 360°+(n×360°), or may be 45°+(n×360°) or greater and 315°+(n×360°) or smaller, or may be 90°+(n×360°) or greater and 270°+(n×360°) or smaller, or may be 135°+(n×360°) or greater and 225°+(n×360°) or smaller. Here, n is 0 or a positive integer. In the example of FIG. 14, the angle θ of the moving radius in the second mechanical angle ψ2 is 180° smaller than the angle θ of the moving radius in the reference mechanical angle ψs.

The angle θ (see FIG. 10) and the size r of the moving radius R of the rotating body 230 may be calculated based on an average of the first signal S1 and an average of the second signal S2 from the position P3 (corresponding to the first mechanical angle ψ1) to the position P1 (the second mechanical angle ψ2) illustrated in FIG. 14. When the angle θ and the size r of the moving radius R are calculated based on the average of the first signal S1 and the average of the second signal S2, the moving radius computing part 12 does not have to compute the angle θ and the size r of the moving radius R based on Expression 1 and Expression 2.

Figure 15:
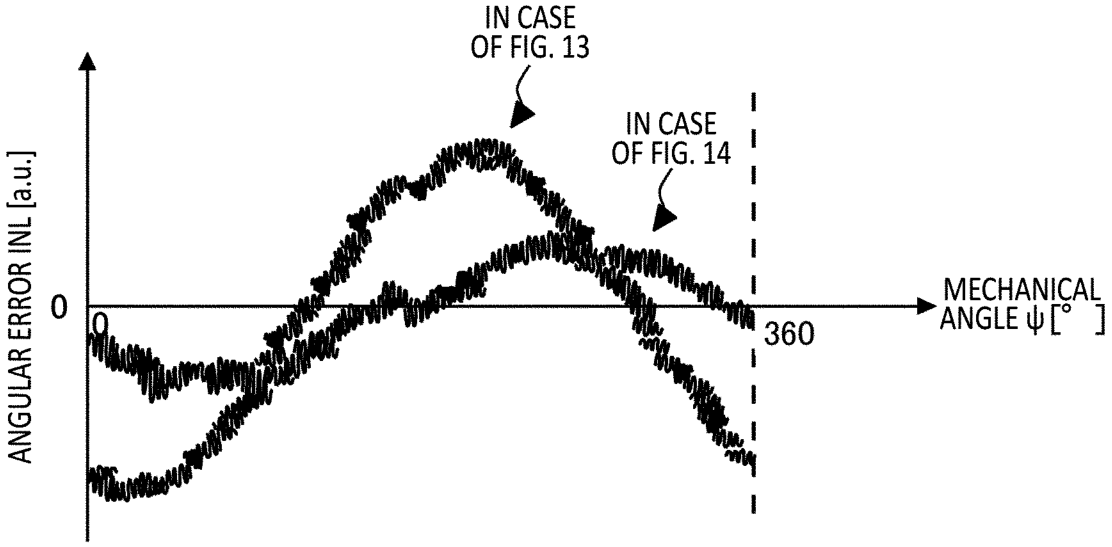
FIG. 15 shows an example of a relationship between the mechanical angle ψ and an angular error INL in an angle θ of a moving radius R.

FIG. 15 shows an example of a relationship between the mechanical angle ψ and the angular error INL in the angle θ of the moving radius R. As in the example of FIG. 11, when the rotating body 230 is inclined from the direction (the coarse broken line portion in FIG. 11) orthogonal to the axis of rotation 215, the output V of the rotation angle sensor 100 periodically changes in accordance with a rotation of the rotating body 230. Thus, the angular error INL may periodically change with respect to a change in the mechanical angle ψ. As can be understood from FIG. 15, the example of FIG. 14 can suppress the angular error INL as compared to the example of FIG. 13.

Figure 16:
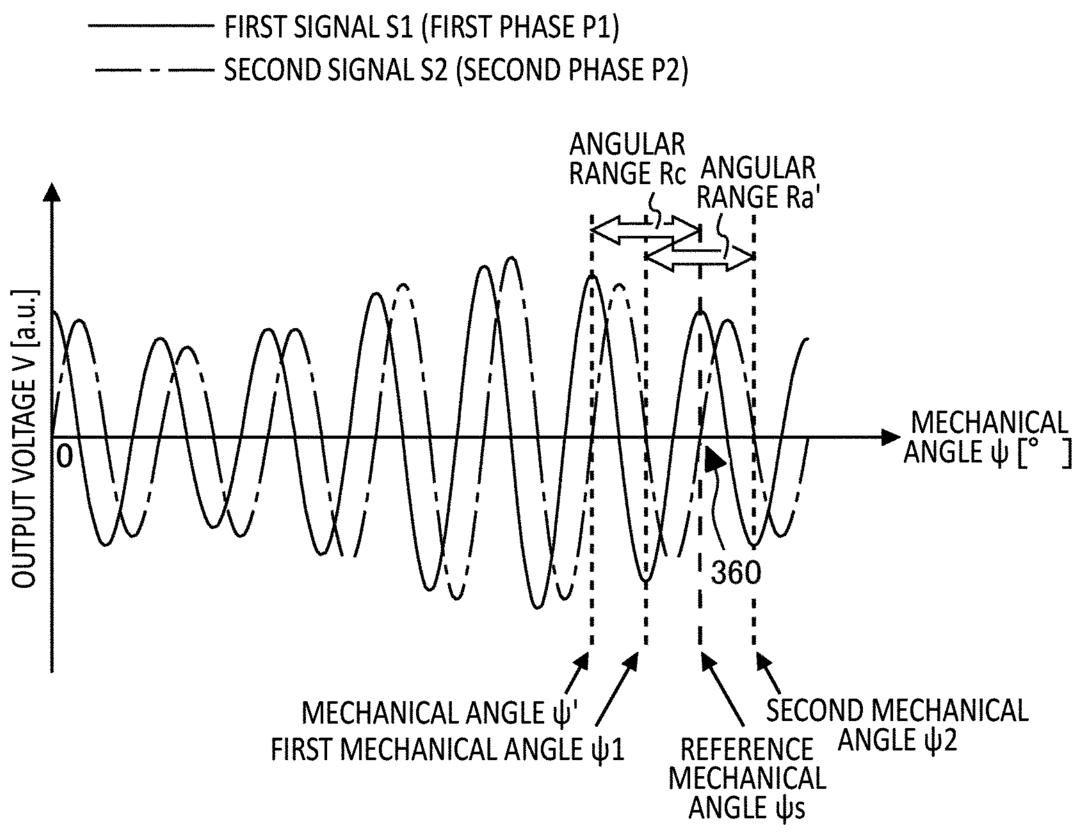
FIG. 16 shows an example of the relationship between the output V of the rotation angle sensor 100 and the mechanical angle ψ of the rotating body 230 in the sensor apparatus 200 of FIG. 11.

FIG. 16 shows an example of the relationship between the output V of the rotation angle sensor 100 and the mechanical angle ψ of the rotating body 230 in the sensor apparatus 200 of FIG. 11. In the present example, an angular range having the first mechanical angle ψ1 as its starting point and the second mechanical angle ψ2 as its ending point is regarded as an angular range Ra'. In the present example, the first mechanical angle ψ1 is smaller than the reference mechanical angle ψs, and the second mechanical angle ψ2 is greater than the reference mechanical angle ψs.

Figure 17:
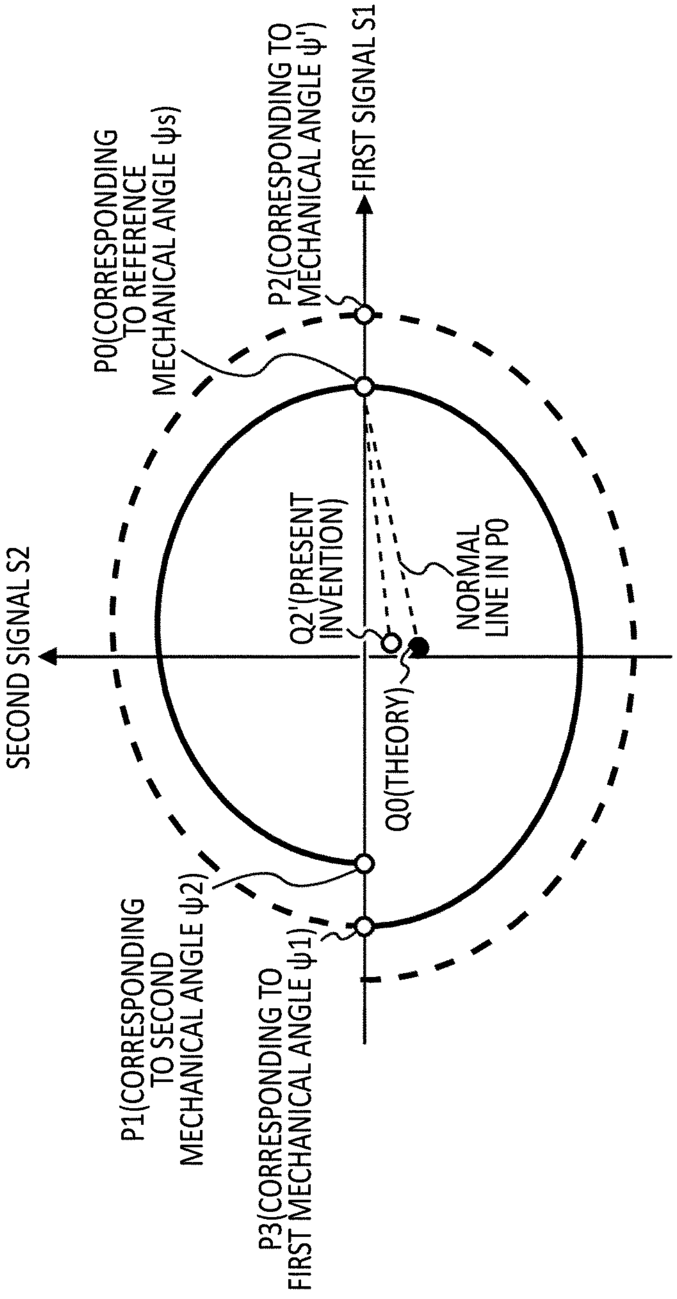
FIG. 17 shows an example of the relationship between the first signal S1 and the second signal S2 from the first mechanical angle ψ1 to a second mechanical angle ψ2 in FIG. 16.

FIG. 17 shows an example of the relationship between the first signal S1 and the second signal S2 from the first mechanical angle ψ1 to the second mechanical angle ψ2 in FIG. 16. In FIG. 17, the thick solid line which is the locus of the moving radius R from the position P3 to the position P1 in FIG. 14 is illustrated with a thick coarse broken line. In FIG. 17, a center of the moving radius R (that is, the solid line in FIG. 14) of the angular range Ra' (that is, from the position P3 to the position P1) in FIG. 16 is regarded as a position Q2'.

In the present example, the calibration parameter calculating part 10 (see FIG. 9) calculates the calibration parameter Pr in a mechanical angle of the angular range Ra' (that is, from the position P3 to the position P1) having the first mechanical angle ψ1 as its starting point. As in the case of the example of FIG. 14, the angular error calculating part 14 (see FIG. 9) calculates the angular error INL in the moving radius R based on the calculated calibration parameter Pr. Also in the present example, the calibration parameter calculating part 10 (see FIG. 9) calculates the calibration parameter Pr in a rotation angle of the angular range Ra' having the first mechanical angle ψ1 different from the reference mechanical angle ψs as its starting point. Thus, the angular error INL in the moving radius R is likely to become small.

In the example of FIG. 17, the angular range Ra' (see FIG. 16) has the first mechanical angle ψ1 as its starting point and the second mechanical angle ψ2 as its ending point. The first mechanical angle ψ1 is smaller than the reference mechanical angle ψs. The second mechanical angle ψ2 is greater than the reference mechanical angle ψs. A difference between the angle θ (see FIG. 10) of the moving radius in the reference mechanical angle θs and the angle θ (see FIG. 10) of the moving radius in the first mechanical angle ψ1 may be greater than 0°+(n×360°) and smaller than 360°+(n×360°), or may be 45°+(n×360°) or greater and 315°+(n×360°) or smaller, or may be 90°+(n×360°) or greater and 270°(n×360°) or smaller, or may be 135°+(n×360°) or greater and 225°+(n×360°) or smaller. Here, n is 0 or a positive integer. In the example of FIG. 17, the angle θ of the moving radius in the first mechanical angle ψ1 is 180° smaller than the angle θ of the moving radius in the reference mechanical angle ψs.

Figure 18:
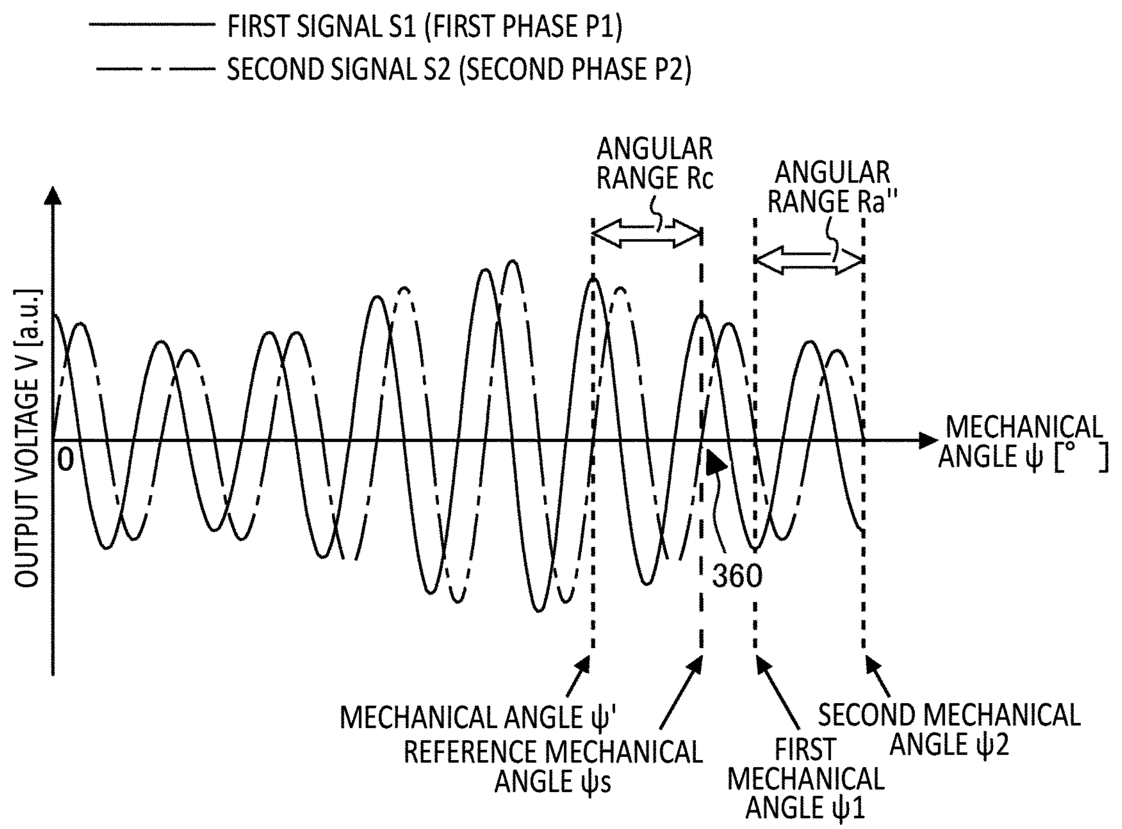
FIG. 18 shows an example of the relationship between the output V of the rotation angle sensor 100 and the mechanical angle ψ of the rotating body 230 in the sensor apparatus 200 of FIG. 11.

FIG. 18 shows an example of the relationship between the output V of the rotation angle sensor 100 and the mechanical angle ψ of the rotating body 230 in the sensor apparatus 200 of FIG. 11. In the present example, the angular range having the first mechanical angle ψ1 as its starting point and the second mechanical angle ψ2 as its ending point is regarded as an angular range Ra". In the present example, the first mechanical angle ψ1 and the second mechanical angle ψ2 are greater than the reference mechanical angle ψs.

Figure 19:
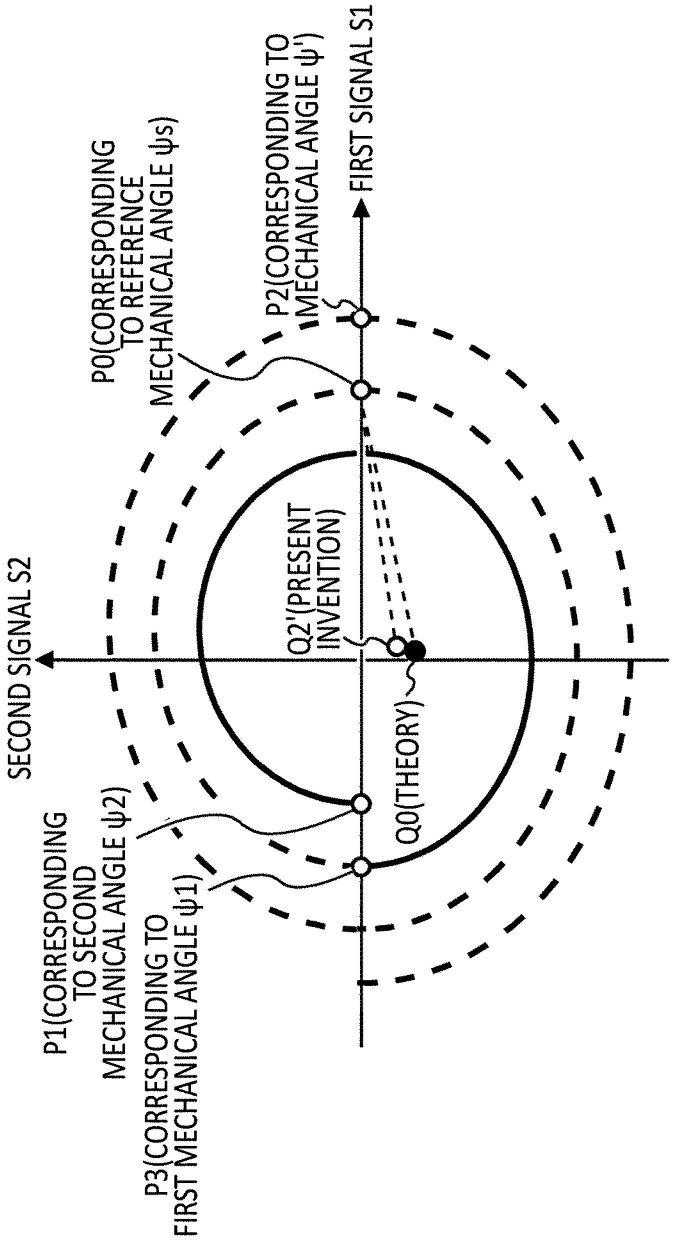
FIG. 19 shows an example of the relationship between the first signal S1 and the second signal S2 from the first mechanical angle ψ1 to the second mechanical angle ψ2 in FIG. 18.

FIG. 19 shows an example of the relationship between the first signal S1 and the second signal S2 from the first mechanical angle ψ1 to the second mechanical angle ψ2 in FIG. 18. In FIG. 19, the thick solid line which is the locus of the moving radius R from the position P3 to the position P1 in FIG. 17 is illustrated with a thick coarse broken line. In FIG. 19, a center of the moving radius R (that is, the solid line in FIG. 14) of the angular range Ra" (that is, from the position P3 to the position P1) in FIG. 18 is regarded as a position Q2".

In the present example, the calibration parameter calculating part 10 (see FIG. 9) calculates the calibration parameter Pr in a rotation angle of the angular range Ra" (that is, from the position P3 to the position P1) having the first mechanical angle ψ1 as its starting point. As in the case of the examples in FIG. 14 and FIG. 17, the angular error calculating part 14 (see FIG. 9) calculates the angular error INL in the moving radius R based on the calculated calibration parameter Pr. Also in the present example, the calibration parameter calculating part 10 (see FIG. 9) calculates the calibration parameter Pr in the rotation angle of the angular range Ra" having the first mechanical angle ψ1 different from the reference mechanical angle ψs as its starting point. Thus, the angular error INL in the moving radius R is likely to become small.

In the example of FIG. 19, the angular range Ra" (see FIG. 18) has the first mechanical angle ψ1 as its starting point and the second mechanical angle ψ2 as its ending point. The first mechanical angle ψ1 and the second mechanical angle ψ2 are greater than the reference mechanical angle ψs. A difference between the angle θ (see FIG. 10) of the moving radius in the first mechanical angle ψ1 and the angle θ (see FIG. 10) of the moving radius in the reference mechanical angle ψs may be greater than 0°+(n×360°) and smaller than 360°+(n×360°), or may be 45°+(n×360°) or greater and 315°+(n×360°) or smaller, or may be 90°+(n×360°) or greater and 270°+(n×360°) or smaller, or may be 135°+(n×360°) or greater and 225°+(n×360°) or smaller. Here, n is 0 or a positive integer. In the example of FIG. 19, the angle θ of the moving radius in the first mechanical angle ψ1 is 180° greater than the angle θ of the moving radius in the reference mechanical angle ψs.

The angular range Ra in the example of FIG. 12, the angular range Ra' in the example of FIG. 16, and the angular range Ra" in the example of FIG. 18 may be angular ranges of 360° of the moving radius R having the first mechanical angle ψ1 as its starting point. The angular range Ra, the angular range Ra', and the angular range Ra" may be angular ranges greater than 180° and 360° or smaller of the moving radius R.

Figure 20:
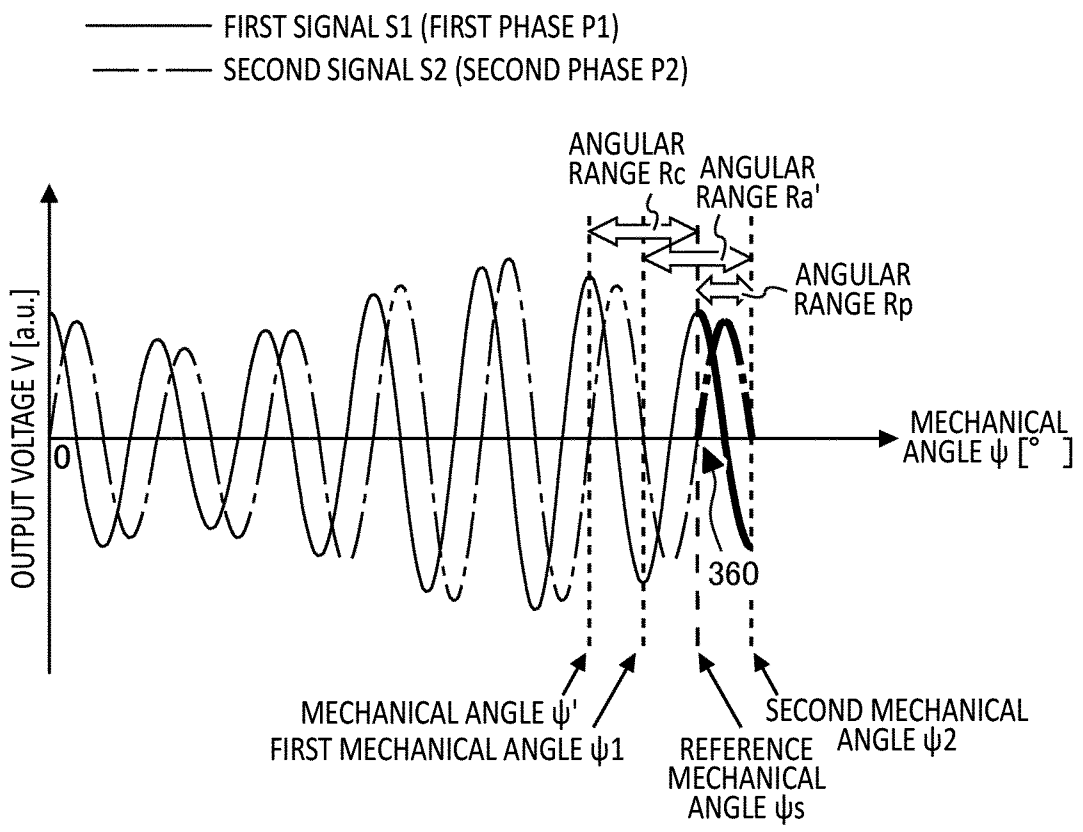
FIG. 20 shows an example of the relationship between the output V of the rotation angle sensor 100 and the mechanical angle ψ of the rotating body 230 in the sensor apparatus 200 of FIG. 11.

FIG. 20 shows an example of the relationship between the output V of the rotation angle sensor 100 and the mechanical angle ψ of the rotating body 230 in the sensor apparatus 200 of FIG. 11. In FIG. 20, it is assumed that the rotating body 230 (see FIG. 1 and FIG. 2) is currently at the position of the reference mechanical angle ψs. The predicting part 40 (see FIG. 9) may predict the first signal S1 and the second signal S2 in one angular range in the angular range from the reference mechanical angle ψs to the second mechanical angle ψ2. In the present example, the predicting part 40 (see FIG. 9) predicts the first signal S1 and the second signal S2 from the reference mechanical angle ψs to the second mechanical angle ψ2. In FIG. 20, the first signal S1 and the second signal S2 predicted by the predicting part 40 are illustrated with a thick solid line and a thick dashed line, respectively. The angular range from the reference mechanical angle ψs to the second mechanical angle ψ2 is regarded as an angular range Rp.

Figure 21:
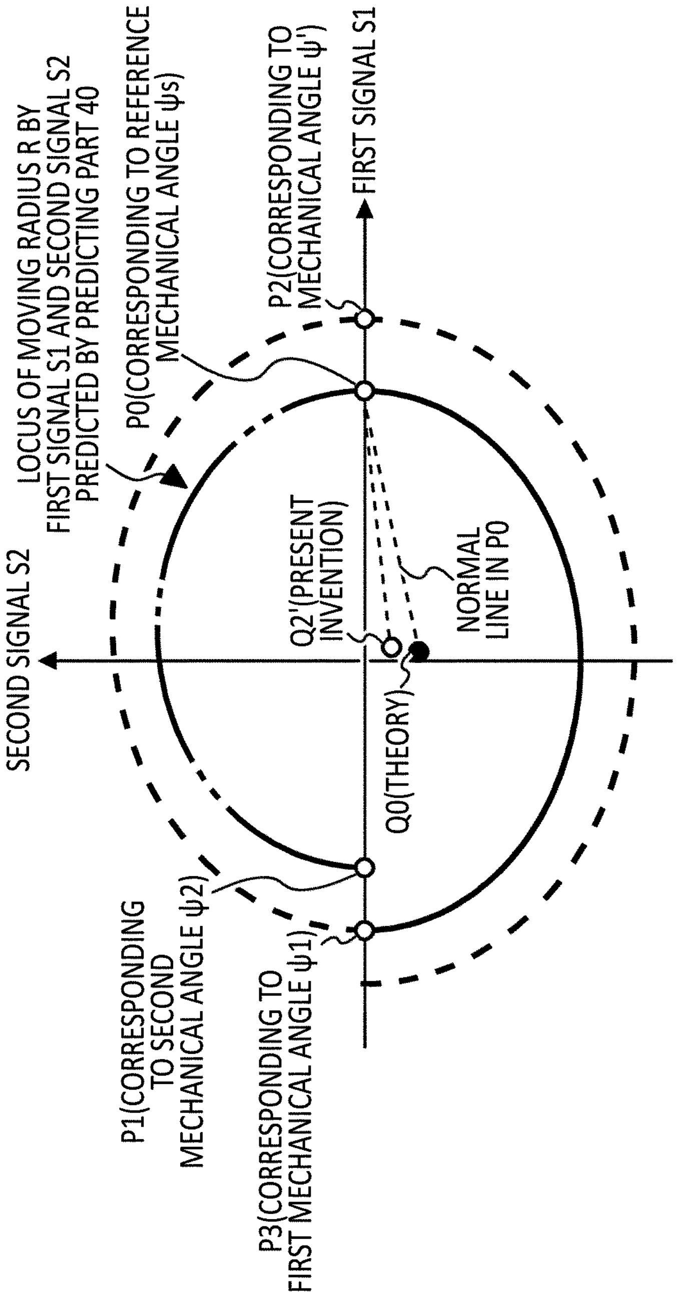
FIG. 21 shows an example of the relationship between the first signal S1 and the second signal S2 from the first mechanical angle ψ1 to the second mechanical angle ψ2 in FIG. 20.

FIG. 21 shows an example of the relationship between the first signal S1 and the second signal S2 from the first mechanical angle ψ1 to the second mechanical angle ψ2 in FIG. 20. In FIG. 21, the locus of the moving radius R by the first signal S1 and the second signal S2 predicted by the predicting part 40 are illustrated with a thick chain double-dashed line.

As in the example of FIG. 11, when the rotating body 230 is inclined from the direction (the coarse broken line portion in FIG. 11) orthogonal to the axis of rotation 215, the output V of the rotation angle sensor 100 periodically changes in accordance with a rotation of the rotating body 230. The storage part 18 (see FIG. 9) may store therein the angle θ and the size r of the moving radius R in one mechanical angle ψ of the rotating body 230. The predicting part 40 may predict, based on the angle θ and the size r of the moving radius R in the one mechanical angle ψ stored on the storage part 18, the angle θ and the size r of the moving radius R in the angular range Rp. The one mechanical angle ψ may be the mechanical angle ψ of the rotating body 230 one round (360°) before the current mechanical angle ψ.

The calibration parameter calculating part 10 (see FIG. 9) may calculate the calibration parameter Pr, in the angular range Rp from the reference mechanical angle ψs to the second mechanical angle ψ2, based on the first signal S1 and the second signal S2 predicted by the predicting part 40. The calibration parameter calculating part 10 may calculate the calibration parameter Pr, for the angular range Rp among the angular range Ra', based on the first signal S1 and the second signal S2 predicted by the predicting part 40.

Figure 22:
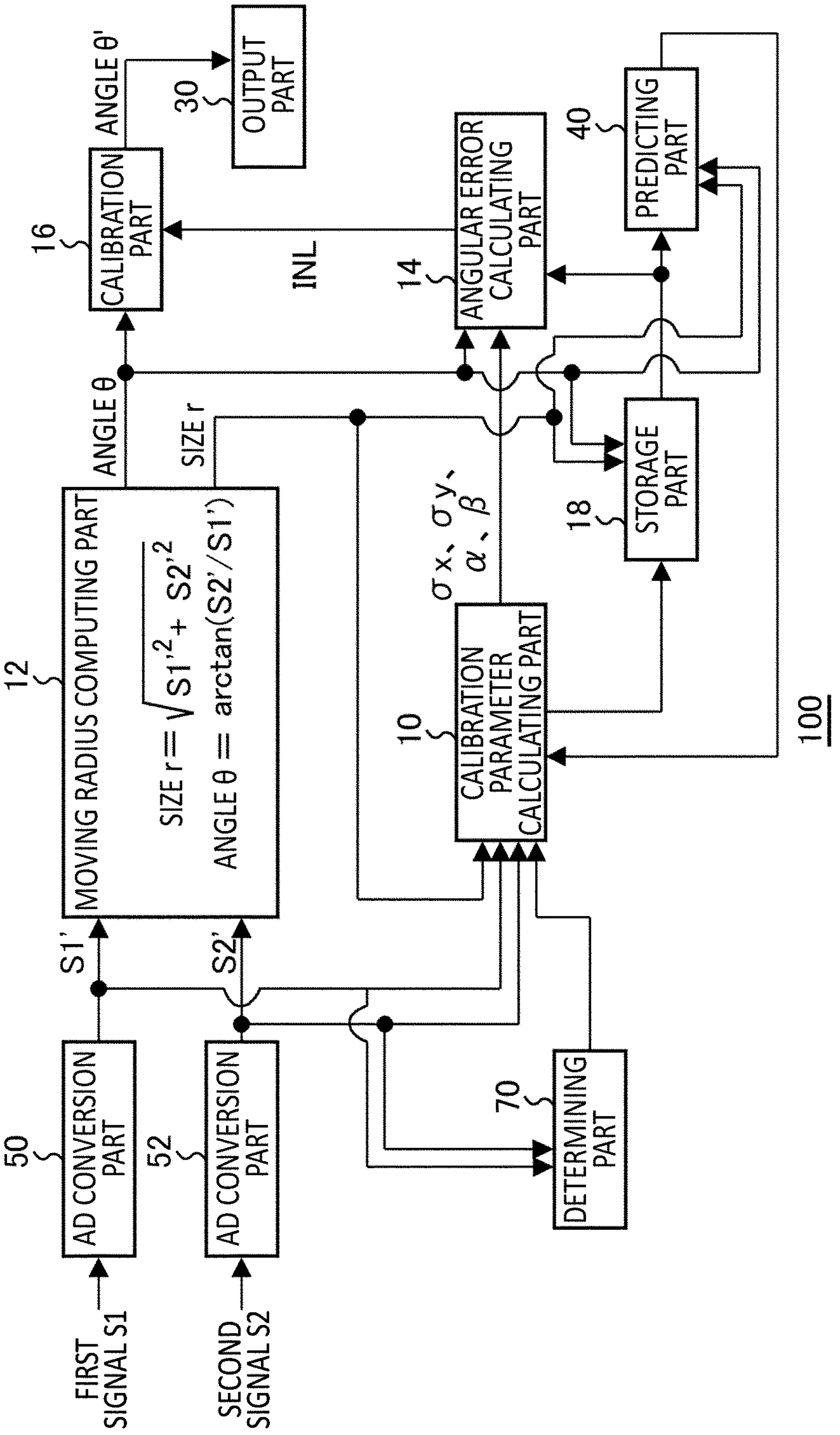
FIG. 22 is a block diagram illustrating another example of the rotation angle sensor 100 according to one embodiment of the present invention.

FIG. 22 is a block diagram illustrating another example of the rotation angle sensor 100 according to one embodiment of the present invention. The rotation angle sensor 100 of the present example is different from the rotation angle sensor 100 illustrated in FIG. 9 in that a determining part 70 is further included.

Figure 23:
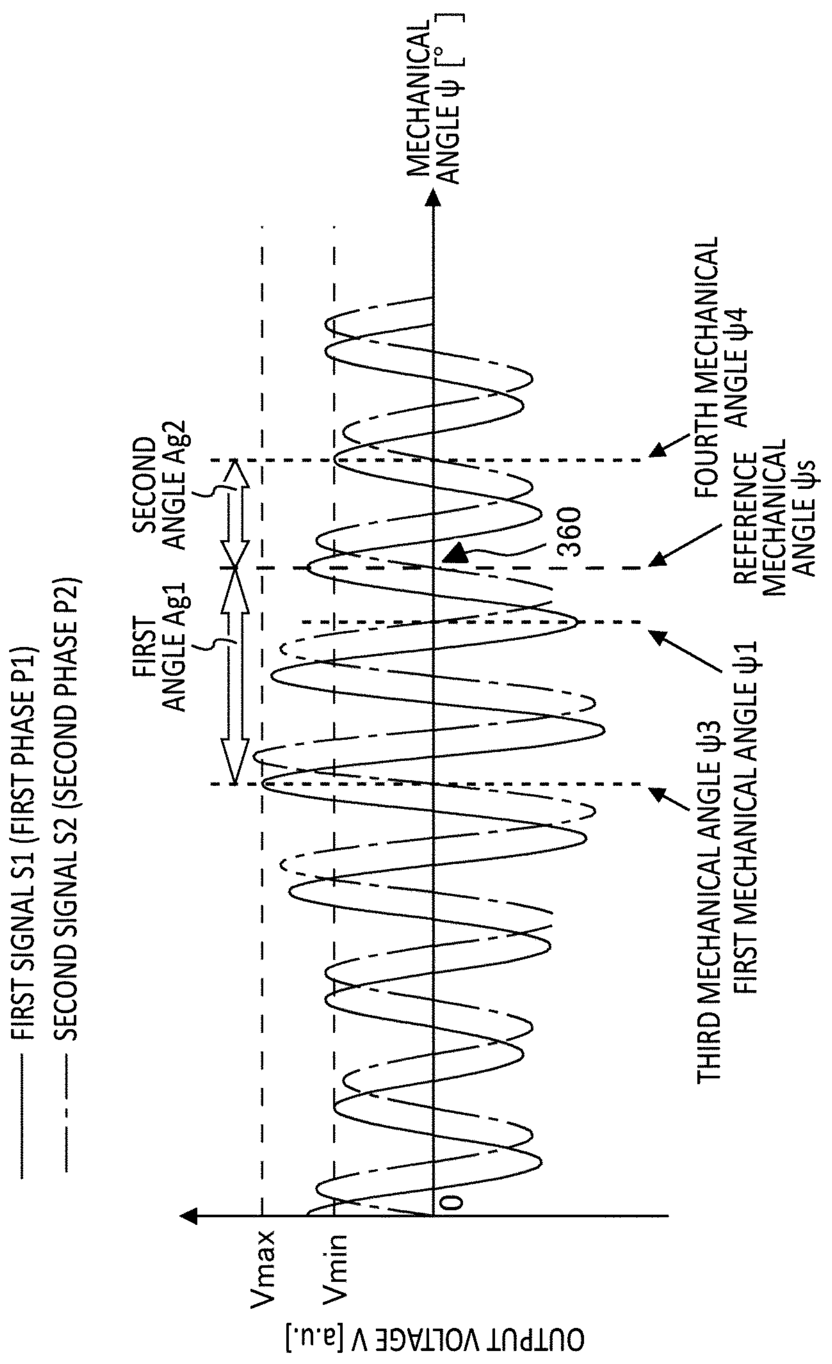
FIG. 23 shows an example of the relationship between the first signal S1 and the second signal S2.

FIG. 23 shows an example of the relationship between the first signal S1 and the second signal S2. The mechanical angle ψ in which the first signal S1 becomes a maximum value Vmax is regarded as a third mechanical angle ψ3. The mechanical angle ψ in which the first signal S1 becomes a minimum value Vmin is regarded as a fourth mechanical angle ψ4. The reference mechanical angle ψs is regarded to be the third mechanical angle ψ3 or greater and the fourth mechanical angle ψ4 or smaller. A differential between the reference mechanical angle ψs and the third mechanical angle ψ3 is regarded as a first angle Ag1. A differential between the reference mechanical angle ψs and the fourth mechanical angle ψ4 is regarded as a second angle Ag2.

In the present example, the determining part 70 (see FIG. 22) determines the first mechanical angle ψ1 based on the first angle Ag1 or the second angle Ag2. When the calibration parameter calculating part 10 (see FIG. 22) calculates the calibration parameter Pr in a mechanical angle of the angular range Ra having the first mechanical angle ψ1 as its starting point, the position Q2 (see FIG. 14) and the calibration parameter Pr may change depending on a position of the first mechanical angle ψ1 in the mechanical angle ψ of the rotating body 230 (see FIG. 1 and FIG. 2).

The determining part 70 (see FIG. 22) may determine, based on the first angle Ag1 or the second angle Ag2, the first mechanical angle ψ1 in which the position Q2 (see FIG. 14) becomes the closest to the position Q0 (see FIG. 14). In this manner, the calibration part 16 (see FIG. 22) can calibrate the angle θ of the moving radius R most accurately.

Figure 24:
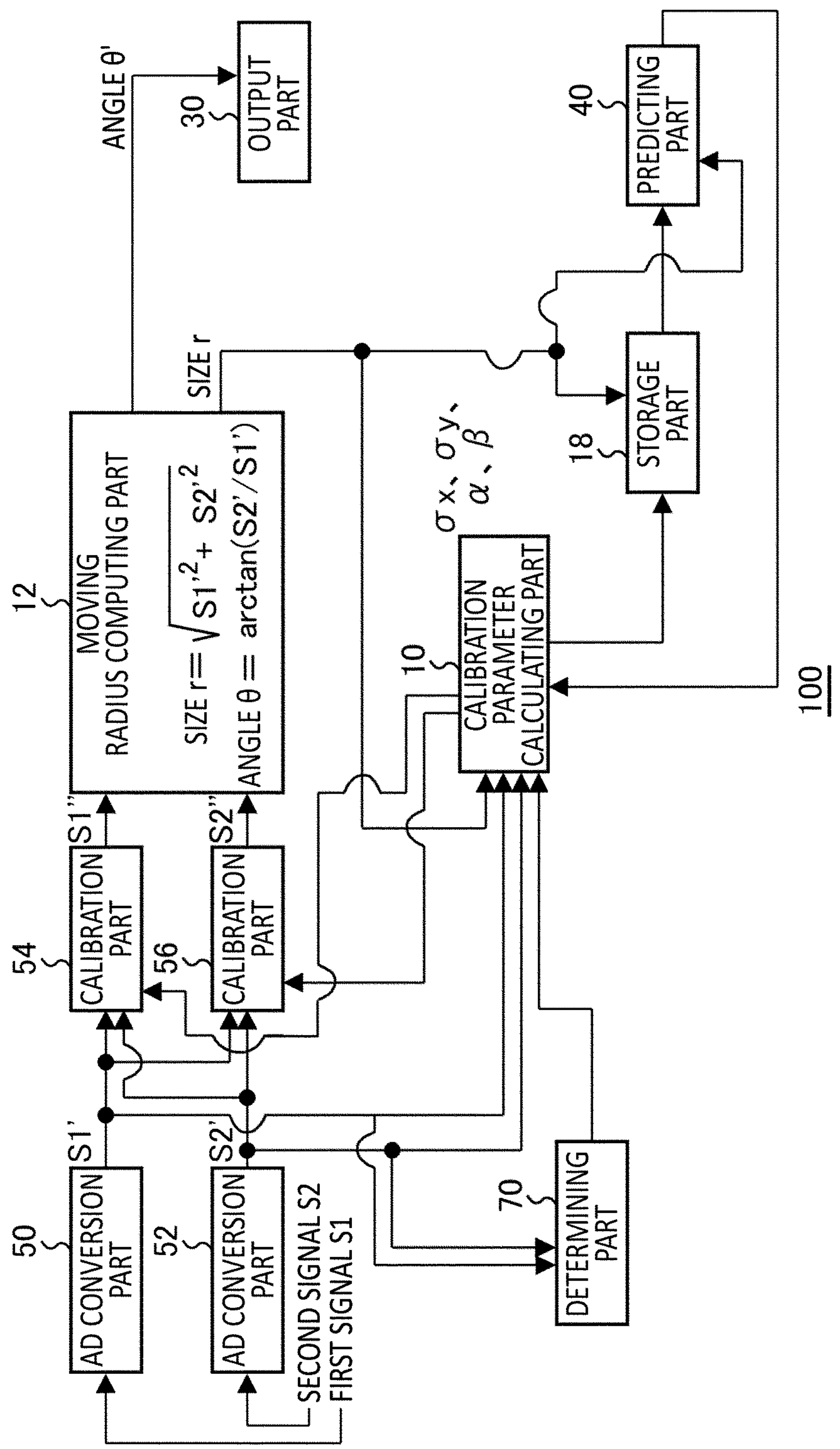
FIG. 24 is a block diagram illustrating another example of the rotation angle sensor 100 according to one embodiment of the present invention.

FIG. 24 is a block diagram illustrating another example of the rotation angle sensor 100 according to one embodiment of the present invention. The rotation angle sensor 100 of the present example is different from the rotation angle sensor 100 illustrated in FIG. 22 in that a calibration part 54 and a calibration part 56 are further included, while the angular error calculating part 14 and the calibration part 16 are not included.

In the present example, the calibration parameter calculating part 10 calculates, in the mechanical angle ψ of one angular range Ra having the first mechanical angle ψ1 as its starting point, based on the first signal S1 and the second signal S2, the calibration parameter Pr which calibrates at least one of an error based on the first signal S1 and an error based on the second signal S2. The error based on the first signal S1 is regarded as an error Er1. The error based on the second signal S2 is regarded as an error Er2.

The calibration part 54 calibrates the error Er1 based on the calibration parameter Pr. The calibration part 54 outputs a signal S1 in which the error Er1 is calibrated. The calibration part 56 calibrates the error Er2 based on the calibration parameter Pr. The calibration part 56 outputs a signal S2" in which the error Er2 is calibrated. The calibration part 54 may compute the signal S1" based on following Expression (8-1). The calibration part 56 may compute the signal S2" based on following Expression (8-2).

$$S1'' = S1' - \sigma_x - \alpha \cdot S1' - \beta \cdot S2' \tag{8-1}$$

$$S2'' = S2' - \sigma_y - \alpha \cdot S2' - \beta \cdot S1' \tag{8-2}$$

The signal S1" and the signal S2" are input to the moving radius computing part 12. In the present example, the moving radius computing part 12 calculates the angle θ and the size r of the moving radius R of the rotating body 230 based on following Expression 9 and Expression 10, respectively.

Expression 9

$$r = \sqrt{S1''^2 + S2''^2} \tag{9}$$

Expression 10

$$\theta = \arctan(S2''/S1'') \tag{10}$$

In the present example, the calibration parameter calculating part 10 calculates the calibration parameter Pr, in the mechanical angle ψ of one angular range Ra having the first mechanical angle ψ1 as its starting point, based on the signal S1" and the signal S2". In this manner, the rotation angle sensor 100 can make the angular error INL small.

Figure 25:
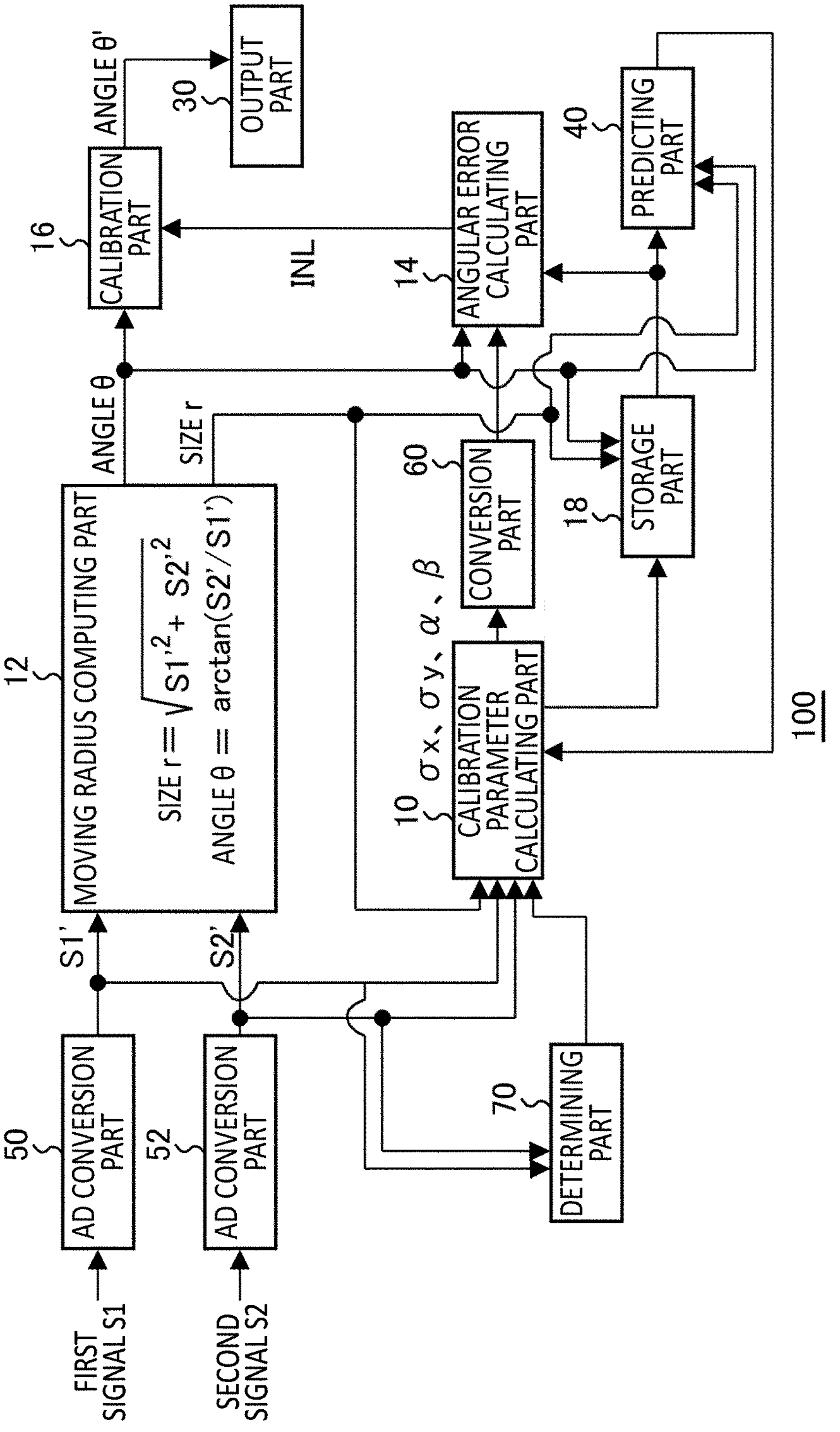
FIG. 25 is a block diagram illustrating another example of the rotation angle sensor 100 according to one embodiment of the present invention.

FIG. 25 is a block diagram illustrating another example of the rotation angle sensor 100 according to one embodiment of the present invention. The rotation angle sensor 100 of the present example is different from the rotation angle sensor 100 illustrated in FIG. 22 in that a conversion part 60 is further included. In the present example, the angular range Ra is one angular range having the reference mechanical angle ϕs as its starting point.

In the relationship between the first signal S1 and the second signal S2 illustrated in FIG. 13, when the axis of the first signal S1 is regarded as the x axis, the axis of the second signal S2 is regarded as the y axis, and the moving radius R is regarded as following Expression (11-1), σx and σy described above are expressed by following Expression (11-2).

Expression 11

$$r = a(\theta - \varphi_s) + b \tag{11-1}$$

$$\begin{pmatrix} \sigma_x \\ \sigma_y \end{pmatrix} = \begin{pmatrix} \dfrac{\sum_{i=0}^{m} r_i \cos((2\pi/(m+1)) * i)}{((m+1)/2)} \\ \dfrac{\sum_{i=0}^{m} r_i \sin((2\pi/(m+1)) * i)}{((m+1)/2)} \end{pmatrix} \xrightarrow{m \to \infty} \begin{pmatrix} 2a\sin\varphi_s \\ -2a\cos\varphi_s \end{pmatrix} \tag{11-2}$$

From Expression 11 and Expression (3-2), following Expression 12 is completed.

Expression 12

$$\begin{pmatrix}\sigma_x\\ \sigma_y\end{pmatrix}=\begin{pmatrix}2a\sin\varphi_s\\ -2a\cos\varphi_z\end{pmatrix}=2\begin{pmatrix}\cos\pi & -\sin\pi\\ \sin\pi & \cos\pi\end{pmatrix}\begin{pmatrix}Cx\\ Cy\end{pmatrix} \tag{12}$$

From Expression 12, σx and σy are obtained by integrating a rotation matrix into coordinates (Cx, Cy) of the position Q0 (see FIG. 13).

The conversion part 60 converts the calibration parameter Pr by a predetermined angle of the moving radius R. The predetermined angle may be greater than 0° and smaller than 360°, or may be 45° or greater and 315° or smaller, or may be 90° or greater and 270° or smaller, or may be 135° or greater and 225° or smaller. In the present example, the predetermined angle is 180° (π[rad]).

In the present example, the calibration parameter calculating part 10 calculates the calibration parameter Pr in the mechanical angle ψ of the angular range Rc (see FIG. 12) having the reference mechanical angle ψs as its starting point. In the present example, the conversion part 60 converts the calibration parameter Pr by the predetermined angle of the moving radius R. In this manner, the rotation angle sensor 100 can make the angular error INL small.

Figure 26:
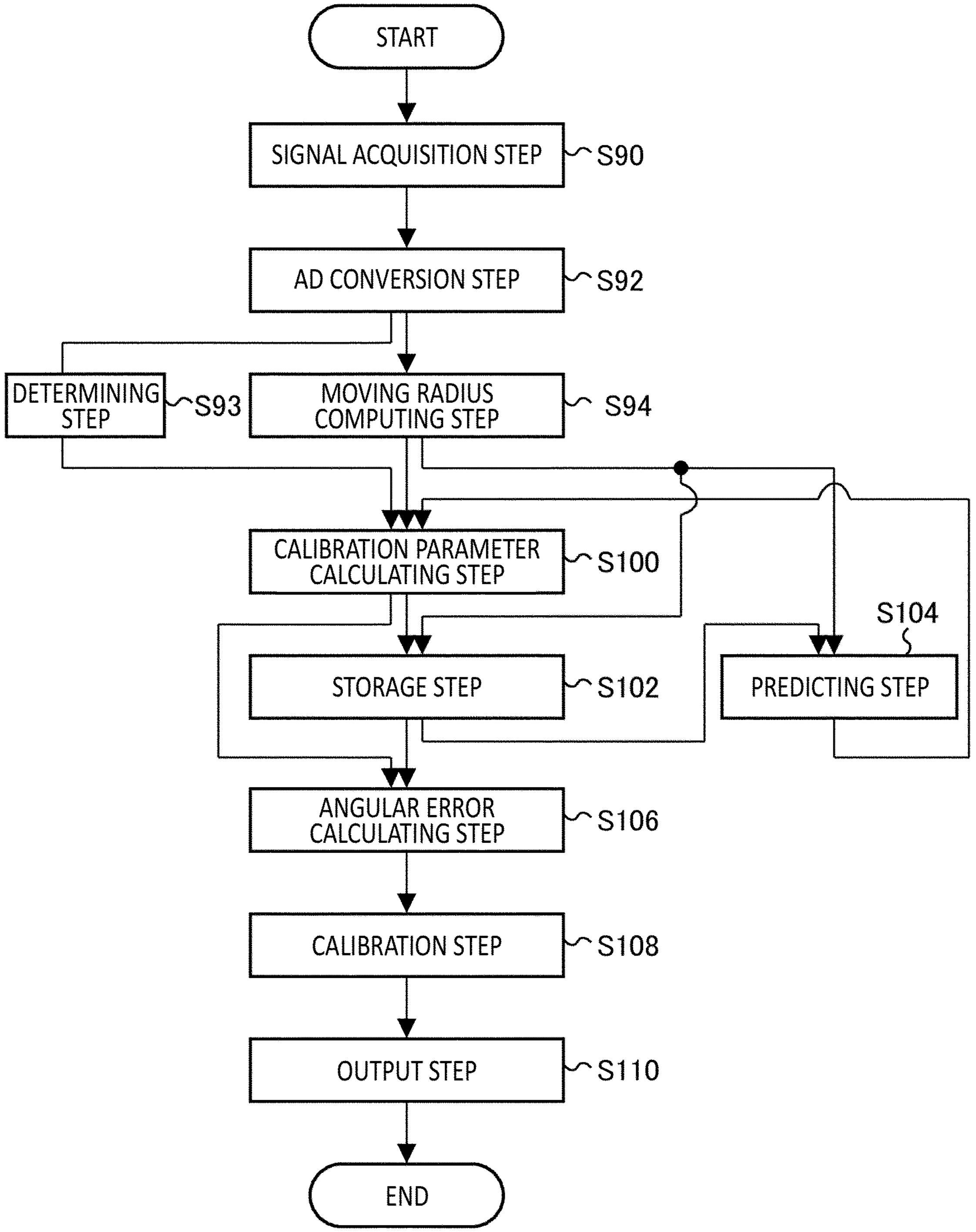
FIG. 26 shows an example of a calibration method of the rotation angle sensor 100 according to one embodiment of the present invention.

FIG. 26 shows an example of a calibration method of the rotation angle sensor 100 according to one embodiment of the present invention. The calibration method of the rotation angle sensor 100 according to one embodiment of the present invention will be described by using the rotation angle sensor 100 illustrated in FIG. 22 as an example.

The calibration method includes a calibration parameter calculating step S100. The calibration method may include a signal acquisition step S90, an AD conversion step S92, a determining step S93, and a moving radius computing step S94. The calibration method may include a storage step S102, a predicting step S104, an angular error calculating step S106, a calibration step S108, and an output step S110.

The signal acquisition step S90 is a step in which the rotation angle sensor 100 acquires the first signal S1 and the second signal S2. The AD conversion step S92 is a step in which the AD conversion part 50 converts the first signal S1 into the signal S1', and the AD conversion part 52 converts the second signal S2 into the signal S2'. The determining step S93 is a step in which the determining part 70 determines the first mechanical angle ψ1 based on the first angle Ag1 or the second angle Ag2. The moving radius computing step S94 is a step in which the moving radius computing part 12 computes the angle θ and the size r of the moving radius R based on the first signal S1 and the second signal S2.

The calibration parameter calculating step S100 is a step in which the calibration parameter calculating part 10 calculates, in a mechanical angle of the angular range Ra, the angular range Ra', or the angular range Ra" having the first mechanical angle ψ1 as its starting point, based on the first signal S1 and the second signal S2, the calibration parameter Pr in the reference mechanical angle ψs. The first mechanical angle ψ1 may be predetermined, or may be determined in the determining step S93, or may be predicted in the predicting step S104.

The storage step S102 is a step in which the storage part 18 stores therein the calibration parameter Pr calculated in the calibration parameter calculating step S100. The storage step S102 may also be a step in which the storage part 18 stores therein the calibration parameter, and the angle θ and the size r of the moving radius R computed in the moving radius computing step S94. The storage step S102 may be a step in which the storage part 18 stores therein the angle θ and the size r of the moving radius R computed in the moving radius computing step S94.

The predicting step S104 is a step in which the predicting part 40 predicts the first signal S1 and the second signal S2 in one angular range in the angular range from the reference mechanical angle ψs to the second mechanical angle ψ2. The predicting step S104 may be a step in which the predicting part 40 predicts the first signal S1 and the second signal S2 from the reference mechanical angle ψs to the second mechanical angle ψ2. The predicting step S104 may be a step in which the predicting part 40 predicts, based on the angle θ and the size r of the moving radius R stored in the storage step S102, the angle θ and the size r of the moving radius R in the angular range Rp (see FIG. 20).

The angular error calculating step S106 is a step in which the angular error calculating part 14 calculates the angular error INL in the moving radius R based on the calibration parameter Pr calculated in the calibration parameter calculating step S100. The angular error calculating step S106 may also be a step in which the angular error calculating part 14 calculates the angular error INL in the moving radius R based on the calibration parameter Pr calculated in the calibration parameter calculating step and the calibration parameter Pr stored in the storage step.

The calibration step S108 is a step in which the calibration part 16 calibrates the angle θ of the moving radius R based on the angular error INL calculated in the angular error calculating step S106. The calibration step S108 may also be a step in which the calibration part 16 calibrates the angle θ per predetermined mechanical angle ii in the angular range Ra (see FIG. 12) based on the angular error INL. The output step S110 is a step in which the output part 30 outputs the angle θ' calibrated in the calibration step S108.

Figure 27:
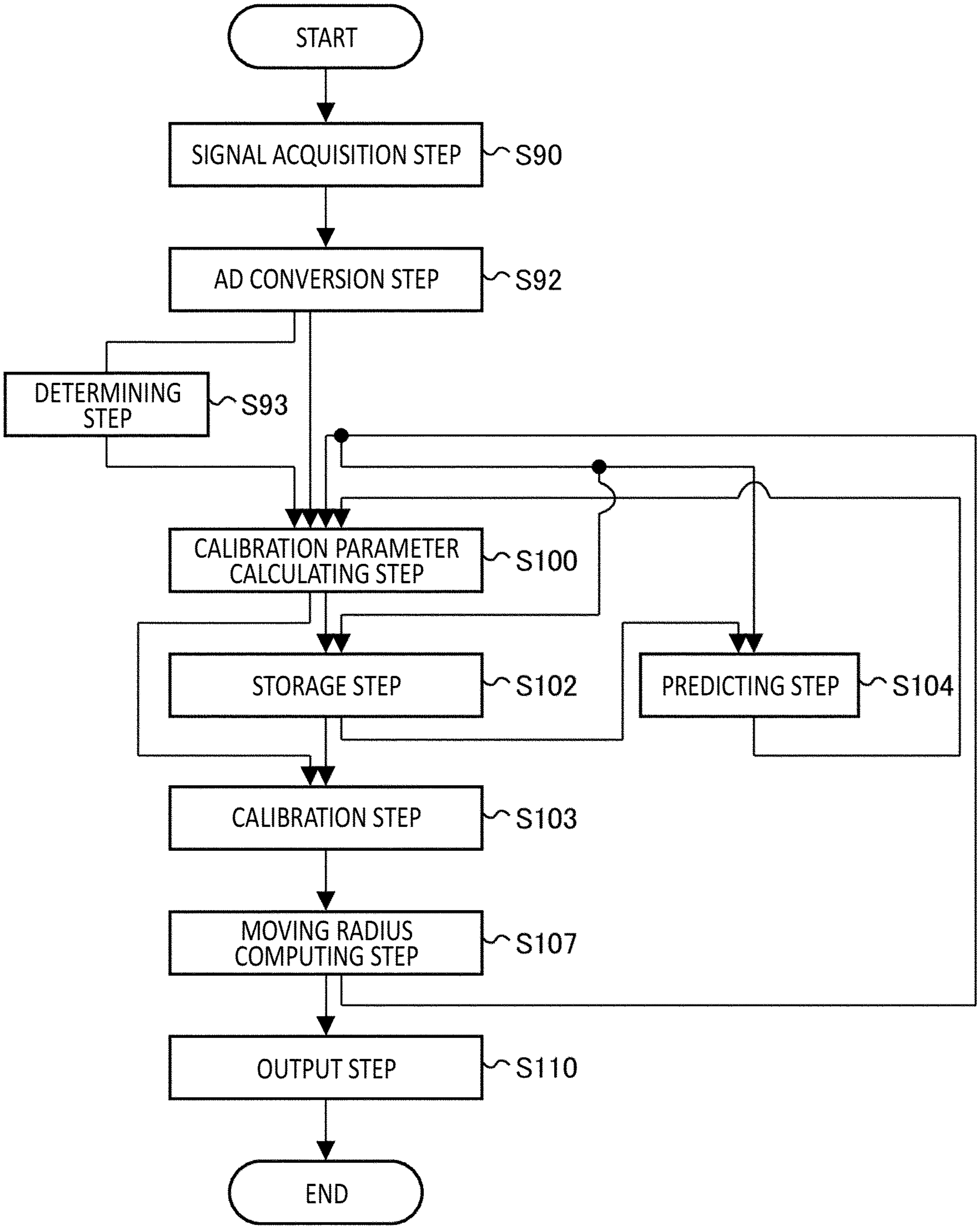
FIG. 27 shows another example of the calibration method of the rotation angle sensor 100 according to one embodiment of the present invention.

FIG. 27 shows another example of the calibration method of the rotation angle sensor 100 according to one embodiment of the present invention. This calibration method is different from the calibration method in FIG. 26 in that the moving radius computing step S94, the angular error calculating step S106, and the calibration step S108 in the calibration method of FIG. 26 are not included, while a calibration step S103 and a moving radius computing step S107 are included. The calibration method of the rotation angle sensor 100 according to one embodiment of the present invention will be described by using the rotation angle sensor 100 illustrated in FIG. 24 as an example.

The calibration step S103 is a step in which the calibration part 54 calibrates the error Er1 based on the calibration parameter Pr to output the calibrated signal S1", and is also a step in which the calibration part 56 calibrates the error Er2 based on the calibration parameter Pr to output the calibrated signal S2". In the present example, the moving radius computing step S107 is a step in which the moving radius computing part 12 computes the angle θ and the size r of the moving radius R based on at least one of the signal S1" and the signal S2". In the present example, the calibration parameter calculating step S100 is a step in which the calibration parameter calculating part 10 calculates, in the mechanical angle ψ of one angular range Ra having the first mechanical angle ψ1 as its starting point, based on the first signal S1 and the second signal S2, the calibration parameter Pr which calibrates at least one of the error Er1 and the error Er2 in the reference mechanical angle ψs of the rotating body 230.

Figure 28:
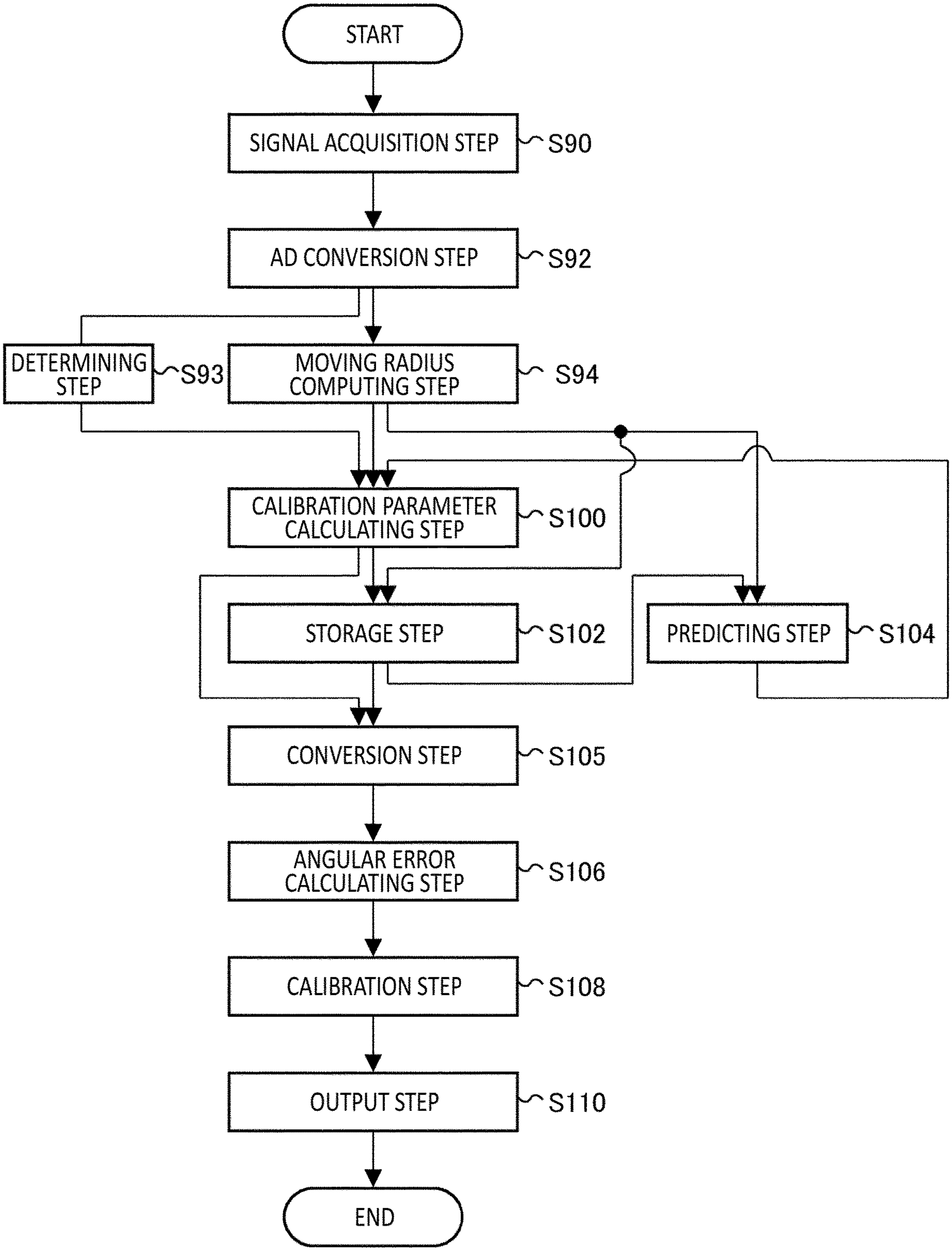
FIG. 28 shows another example of the calibration method of the rotation angle sensor 100 according to one embodiment of the present invention.

FIG. 28 shows another example of the calibration method of the rotation angle sensor 100 according to one embodiment of the present invention. This calibration method is different from the calibration method of FIG. 26 in that a conversion step S105 is further included instead of the calibration step S108 in the calibration method of FIG. 26. The calibration method of the rotation angle sensor 100 according to one embodiment of the present invention will be described by using the rotation angle sensor 100 illustrated in FIG. 25 as an example.

In the present example, the calibration parameter calculating step S100 is a step in which the calibration parameter calculating part 10 calculates, in a mechanical angle of the angular range Ra, the angular range Ra', or the angular range Ra", based on the first signal S1 and the second signal S2, the calibration parameter Pr in the reference mechanical angle ψs. In the present example, the angular range Ra, the angular range Ra', or the angular range Ra" is one angular range having the reference mechanical angle ϕs as its starting point.

The conversion step S105 is a step in which the calibration parameter Pr calculated in the calibration parameter calculating step S100 is converted by a predetermined angle of the moving radius R. The predetermined angle is, for example, 180° (π[rad]).

Figure 29:
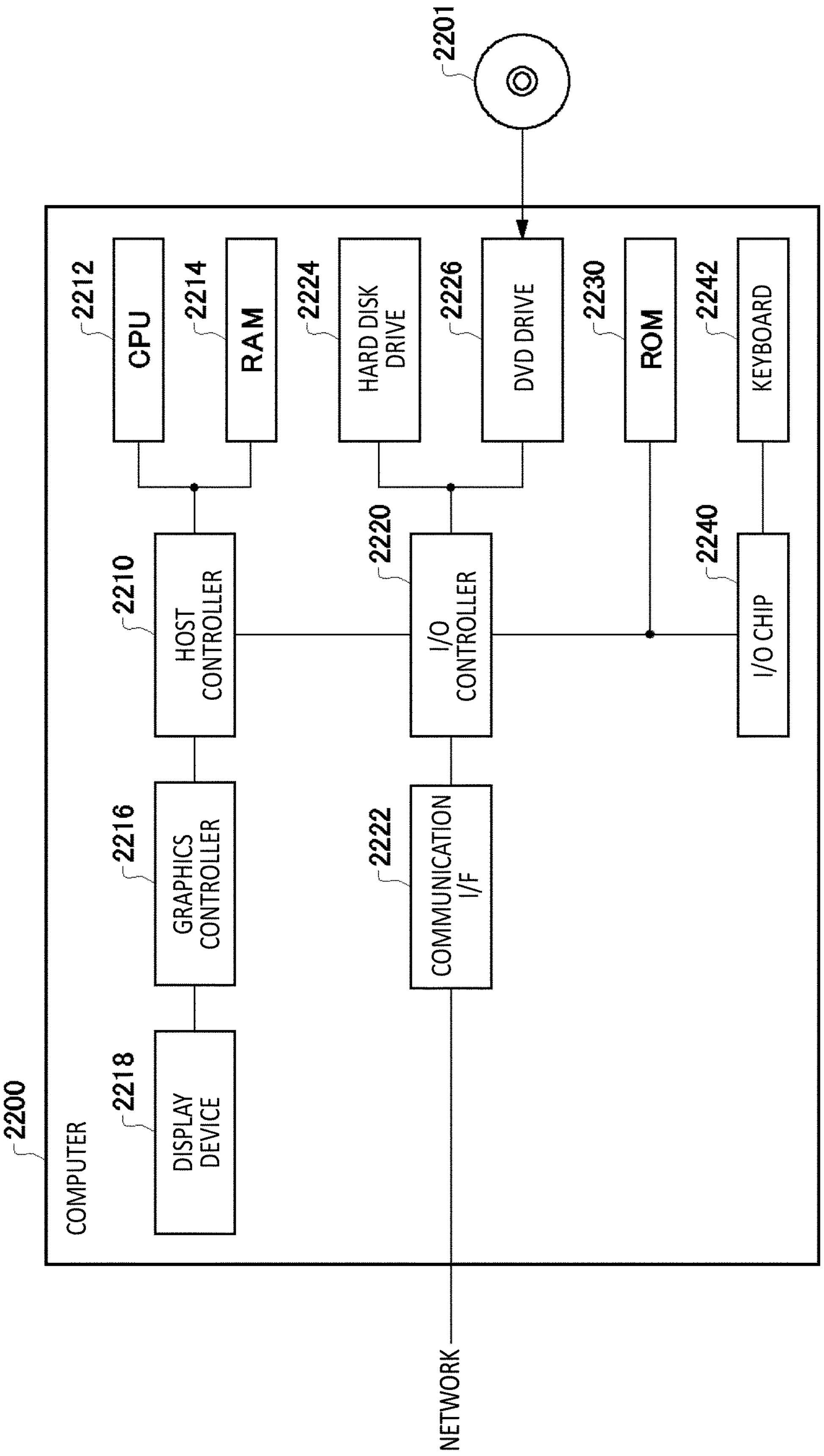
FIG. 29 shows an example of a computer 2200 in which the rotation angle sensor 100 according to one embodiment of the present invention may be entirely or partially embodied.

FIG. 29 shows an example of a computer 2200 in which the rotation angle sensor 100 according to one embodiment of the present invention may be entirely or partially embodied. A program installed in the computer 2200 can cause the computer 2200 to function as an operation associated with the rotation angle sensor 100 according to an embodiment of the present invention or as one or more sections of the rotation angle sensor 100, or execute the operation or the one or more sections, or the program can cause the computer 2200 to execute each step (see FIG. 26 to FIG. 28) according to a method of the present invention. The program may be executed by a CPU 2212 to cause the computer 2200 to execute a specific operation associated with some or all of the blocks in the flow charts (FIG. 26 to FIG. 28) and the block diagrams (FIG. 9, FIG. 22, FIG. 24, and FIG. 25) described in the present specification.

The computer 2200 according to one embodiment of the present invention includes the CPU 2212, a RAM 2214, a graphics controller 2216, and a display device 2218. The CPU 2212, the RAM 2214, the graphics controller 2216, and the display device 2218 are mutually connected by a host controller 2210. The computer 2200 further includes input and output units such as a communication interface 2222, a hard disk drive 2224, a DVD-ROM drive 2226, and an IC card drive. The communication interface 2222, the hard disk drive 2224, the DVD-ROM drive 2226, and the IC card drive, and the like are connected to the host controller 2210 via an input and output controller 2220. The computer further includes legacy input and output units such as a ROM 2230 and a keyboard 2242. The ROM 2230, the keyboard 2242, and the like are connected to the input and output controller 2220 through an input and output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in the RAM 2214 itself to cause the image data to be displayed on the display device 2218.

The communication interface 2222 communicates with other electronic devices via a network. The hard disk drive 2224 stores programs and data used by the CPU 2212 in the computer 2200. The DVD-ROM drive 2226 reads the programs or the data from a DVD-ROM 2201, and provides the read programs or data to the hard disk drive 2224 via the RAM 2214. The IC card drive reads programs and data from an IC card, or writes programs and data to the IC card.

The ROM 2230 stores therein a boot program or the like executed by the computer 2200 at the time of activation, or a program depending on the hardware of the computer 2200. The input and output chip 2240 may connect various input and output units via a parallel port, a serial port, a keyboard port, a mouse port, or the like to the input and output controller 2220.

The program is provided by a computer readable medium such as the DVD-ROM 2201 or the IC card. The program is read from a computer readable medium, installed in the hard disk drive 2224, the RAM 2214, or the ROM 2230 which are also examples of the computer readable medium, and executed by the CPU 2212. The information processing described in these programs is read by the computer 2200 and provides cooperation between the programs and various types of hardware resources described above. An apparatus or method may be constituted by realizing the operation or processing of information in accordance with the usage of the computer 2200.

For example, when a communication is performed between the computer 2200 and an external device, the CPU 2212 may execute a communication program loaded onto the RAM 2214 to instruct communication processing to the communication interface 2222, on the basis of the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

The CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, or the like. The CPU 2212 may perform various types of processing on the data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, information processing, conditional judging, conditional branch, unconditional branch, search or replace of information, or the like, as described throughout the present disclosure and designated by an instruction sequence of programs. The CPU 2212 may write the result back to the RAM 2214.

The CPU 2212 may search for information in a file, a database, or the like in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, read the attribute value of the second attribute stored in the entry, and read a second attribute value to obtain the attribute value of the second attribute associated with the first attribute satisfying the predetermined condition.

The above-explained program or software modules may be stored in the computer readable media on the computer 2200 or of the computer 2200. A recording medium such as a hard disk or a RAM provided in a server system connected to a dedicated communication network or the Internet can be used as the computer readable media. The program may be provided to the computer 2200 by the recording medium.

While the present invention has been described with the embodiments, the technical scope of the present invention is not limited to the scope described in the above-described embodiments. It is apparent to persons skilled in the art that various alterations or improvements can be added to the above-described embodiments. It is also apparent from the scope of the claims that the embodiments added with such alterations or improvements can be included in the technical scope of the present invention.

Note that the operations, procedures, steps, and stages of each process performed by an apparatus, system, program, and method shown in the claims, specification, or diagrams can be performed in any order as long as the order is not indicated by "prior to," "before," or the like and as long as the output from a previous process is not used in a later process. Even if the operation flow is described by using phrases such as "first" or "next" in the scope of the claims, specification, or drawings, it does not necessarily mean that the process must be performed in this order.

EXPLANATION OF REFERENCES

10 . . . calibration parameter calculating part, 12 . . . moving radius computing part, 14 . . . angular error calculating part, 16 . . . calibration part, 18 . . . storage part, 30 . . . output part, 40 . . . predicting part, 50 . . . AD conversion part, 52 . . . AD conversion part, 54 . . . calibration part, 56 . . . calibration part, 60 . . . conversion part, 70 . . . determining part, 100 . . . rotation angle sensor, 102 . . . detection part, 110 . . . signal generating part, 200 . . . sensor apparatus, 210 . . . motor, 215 . . . axis of rotation, 220 . . . fixing member, 230 . . . rotating body, 232 . . . main scale, 234 . . . slit, 236 . . . vernier scale, 238 . . . slit, 2200 . . . computer, 2201 . . . DVD-ROM, 2210 . . . host controller, 2212 . . . CPU, 2214 . . . RAM, 2216 . . . graphics controller, 2218 . . . display device, 2220 . . . input and output controller, 2222 . . . communication interface, 2224 . . . hard disk drive, 2226 . . . DVD-ROM drive, 2230 . . . ROM, 2240 . . . input and output chip, 2242 . . . keyboard.

What is claimed is:

1. A rotation angle sensor which outputs N periods (N>1) of a first signal of a first phase and a second signal of a second phase forming a predetermined phase angle with the first phase per single rotation of a rotating body, the rotation angle sensor comprising:

a calibration parameter calculating part which calculates, in a mechanical angle of one angular range having a first mechanical angle different from a reference mechanical angle as its starting point, based on the first signal and the second signal, a calibration parameter which calibrates an error in a moving radius of the rotating body in the reference mechanical angle of the rotating body.

2. The rotation angle sensor according to claim 1, wherein the one angular range has the first mechanical angle as its starting point and a second mechanical angle as its ending point, and the first mechanical angle and the second mechanical angle are smaller than the reference mechanical angle.

3. The rotation angle sensor according to claim 2, wherein an angle of the moving radius in the second mechanical angle is 180° smaller than an angle of the moving radius in the reference mechanical angle.

4. The rotation angle sensor according to claim 2, further comprising a moving radius computing part which computes an angle and a size of the moving radius of the rotating body based on the first signal and the second signal, wherein the calibration parameter calculating part calculates the calibration parameter based on the angle and the size of the moving radius of the rotating body computed by the moving radius computing part.

5. The rotation angle sensor according to claim 1, wherein the one angular range has the first mechanical angle as its starting point and a second mechanical angle as its ending point, and the first mechanical angle is smaller than the reference mechanical angle, and the second mechanical angle is greater than the reference mechanical angle.

6. The rotation angle sensor according to claim 5, wherein an angle of the moving radius in the first mechanical angle is 180° smaller than an angle of the moving radius in the reference mechanical angle.

7. The rotation angle sensor according to claim 5, further comprising a predicting part which predicts the first signal and the second signal from the reference mechanical angle to the second mechanical angle, wherein the calibration parameter calculating part calculates the calibration parameter, in an angular range from the reference mechanical angle to the second mechanical angle, based on the first signal and the second signal predicted by the predicting part.

8. The rotation angle sensor according to claim 5, further comprising a moving radius computing part which computes an angle and a size of the moving radius of the rotating body based on the first signal and the second signal, wherein the calibration parameter calculating part calculates the calibration parameter based on the angle and the size of the moving radius of the rotating body computed by the moving radius computing part.

9. The rotation angle sensor according to claim 1, wherein the one angular range has the first mechanical angle as its starting point and a second mechanical angle as its ending point, and the first mechanical angle and the second mechanical angle are greater than the reference mechanical angle.

10. The rotation angle sensor according to claim 9, wherein an angle of the moving radius in the first mechanical angle is 180° greater than an angle of the moving radius in the reference mechanical angle.

11. The rotation angle sensor according to claim 9, further comprising a predicting part which predicts the first signal and the second signal from the reference mechanical angle to the second mechanical angle, wherein the calibration parameter calculating part calculates the calibration parameter, in an angular range from the reference mechanical angle to the second mechanical angle, based on the first signal and the second signal predicted by the predicting part.

12. The rotation angle sensor according to claim 9, further comprising a moving radius computing part which computes an angle and a size of the moving radius of the rotating body based on the first signal and the second signal, wherein the calibration parameter calculating part calculates the calibration parameter based on the angle and the size of the moving radius of the rotating body computed by the moving radius computing part.

13. The rotation angle sensor according to claim 1, wherein the one angular range is an angular range of 360° of the moving radius having the first mechanical angle as its starting point.

14. The rotation angle sensor according to claim 13, further comprising a moving radius computing part which computes an angle and a size of the moving radius of the rotating body based on the first signal and the second signal, wherein the calibration parameter calculating part calculates the calibration parameter based on the angle and the size of the moving radius of the rotating body computed by the moving radius computing part.

15. The rotation angle sensor according to claim 1, further comprising a determining part, wherein the reference mechanical angle is a third mechanical angle of the rotating body or greater, the first signal being maximum in the third mechanical angle, and is a fourth mechanical angle of the rotating body or smaller, the first signal being minimum in the fourth mechanical angle, and the determining part determines the first mechanical angle based on a first angle which is a differential between the reference mechanical angle and the third mechanical angle or a second angle which is a differential between the reference mechanical angle and the fourth mechanical angle.

16. The rotation angle sensor according to claim 15, further comprising a moving radius computing part which computes an angle and a size of the moving radius of the rotating body based on the first signal and the second signal, wherein the calibration parameter calculating part calculates the calibration parameter based on the angle and the size of the moving radius of the rotating body computed by the moving radius computing part.

17. The rotation angle sensor according to claim 1, further comprising a moving radius computing part which computes an angle and a size of the moving radius of the rotating body based on the first signal and the second signal, wherein the calibration parameter calculating part calculates the calibration parameter based on the angle and the size of the moving radius of the rotating body computed by the moving radius computing part.

18. A calibration method of a rotation angle sensor which outputs N periods (N>1) of a first signal of a first phase and a second signal of a second phase forming a predetermined phase angle with the first phase per single rotation of a rotating body, the calibration method comprising:

calculating, by a calibration parameter calculating part, in a mechanical angle of one angular range having a first mechanical angle different from a reference mechanical angle as its starting point, based on the first signal and the second signal, a calibration parameter which calibrates an error in a moving radius of the rotating body in the reference mechanical angle of the rotating body.

* * * * *